US010228258B2

(12) United States Patent
Mach et al.

(10) Patent No.: US 10,228,258 B2
(45) Date of Patent: Mar. 12, 2019

(54) DETERMINING TOP VENUES FROM AGGREGATED USER ACTIVITY LOCATION DATA

(71) Applicant: Strava, Inc., San Francisco, CA (US)

(72) Inventors: Paul Mach, Oakland, CA (US); Leo Romanovsky, San Francisco, CA (US)

(73) Assignee: Strava, Inc., San Francisco, CA (US)

( * ) Notice: Subject to any disclaimer, the term of this patent is extended or adjusted under 35 U.S.C. 154(b) by 0 days.

(21) Appl. No.: 14/956,140

(22) Filed: Dec. 1, 2015

(65) Prior Publication Data
US 2016/0161274 A1    Jun. 9, 2016

Related U.S. Application Data

(60) Provisional application No. 62/087,171, filed on Dec. 3, 2014.

(51) Int. Cl.
G01C 21/34 (2006.01)
G06F 17/30 (2006.01)
G06Q 30/02 (2012.01)
G01S 19/19 (2010.01)

(52) U.S. Cl.
CPC ..... G01C 21/3476 (2013.01); G01C 21/3407 (2013.01); G06F 17/30781 (2013.01); G06Q 30/02 (2013.01); G01S 19/19 (2013.01)

(58) Field of Classification Search
None
See application file for complete search history.

(56) References Cited

U.S. PATENT DOCUMENTS

| 7,454,002 | B1 | 11/2008 | Gardner et al. | |
| 2008/0033633 | A1 | 2/2008 | Akiyoshi et al. | |
| 2010/0088023 | A1 | 4/2010 | Werner | |
| 2013/0085861 | A1 | 4/2013 | Dunlap | |
| 2013/0131974 | A1* | 5/2013 | Uyeki | G01C 21/32 701/410 |
| 2013/0226201 | A1 | 8/2013 | Miller et al. | |
| 2014/0256360 | A1 | 9/2014 | Busch | |
| 2014/0372022 | A1* | 12/2014 | Witmer | G01C 21/32 701/423 |
| 2015/0204688 | A1* | 7/2015 | Gearhart | G01C 21/3679 701/540 |

OTHER PUBLICATIONS

New York: Food, Nightlife, Entertainment, Foursquare, downloaded on Nov. 30, 2015.

* cited by examiner

*Primary Examiner* — Lail A Kleinman
(74) *Attorney, Agent, or Firm* — Van Pelt, Yi & James LLP

(57) ABSTRACT

Determining top venues from aggregated user activity location data is disclosed, including: receiving a set of location data associated with user activities; determining a plurality of stop events using the set of location data associated with the user activities; and selecting a plurality of top venues based at least in part on the plurality of stop events. Furthermore, top venues associated with user activities can be used to detect group activities and/or tour activities.

20 Claims, 15 Drawing Sheets

US 10,228,258 B2

DETERMINING TOP VENUES FROM AGGREGATED USER ACTIVITY LOCATION DATA

CROSS REFERENCE TO OTHER APPLICATIONS

This application claims priority to U.S. Provisional Patent Application No. 62/087,171 entitled DETECTING PATTERNS OF MOVEMENT BY LOCATION FROM AGGREGATED GPS ACTIVITY DATA filed Dec. 3, 2014 which is incorporated herein by reference for all purposes.

BACKGROUND OF THE INVENTION

An athlete may make one or more stops during a course of a bike ride or a run. For example, the athlete may make a stop to get a beverage or a meal. The athlete may also make a stop to enjoy a view or take a break. Among athlete communities, certain places may be popular for athletes to stop or meet up at during certain times of the week or day.

BRIEF DESCRIPTION OF THE DRAWINGS

Various embodiments of the invention are disclosed in the following detailed description and the accompanying drawings.

DETAILED DESCRIPTION

Figure 1:
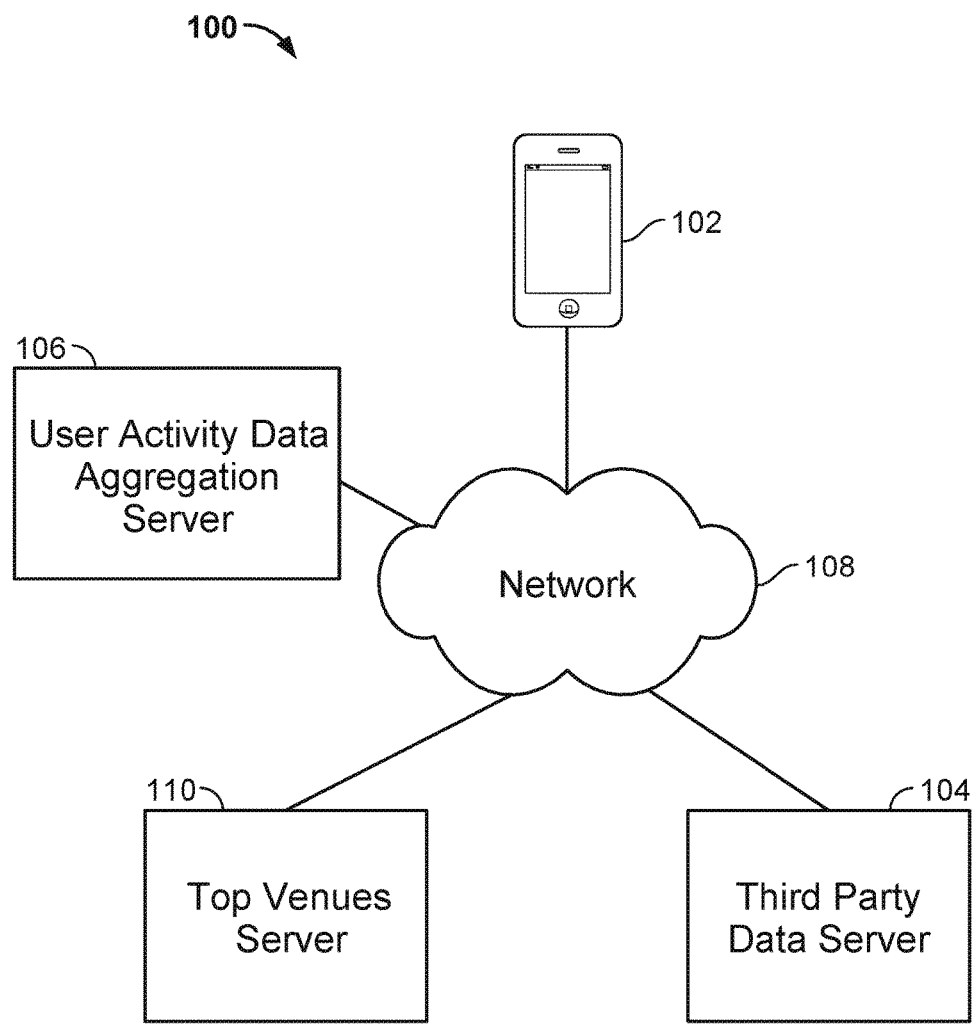
FIG. 1 is a diagram showing a system for determining top venues from aggregated user activity location data in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining top venues from aggregated user activity location data are described herein. A set of location data is associated with each user activity. Examples of location data include Geographic Positioning System (GPS) data and WiFi positioning system data. In various embodiments, a user activity comprises a recorded instance of an athletic performance, such as a run or a bike ride. For example, each user activity is recorded by a GPS-enabled device with at least GPS data and time stamps along various points of the user activity. A plurality of stop events is determined using the set of location (e.g., GPS) data associated with the user activities. In various embodiments, a "stop event" comprises a portion in the user activity that meets criteria associated with stopping. In various embodiments, a stop event is associated with at least corresponding location (e.g., GPS) data, start and/or end times, and duration. For example, a stop event may occur at the start, end, and one or more times in between the start and the end of a user activity. A plurality of top venues is selected based at least in part on the plurality of stop events. The location (e.g., GPS) data associated with the stop events can be compared to those of known venues to determine venues corresponding to at least some of the stop events. In various embodiments, a "venue" comprises a point of interest (POI). Examples of venues/points of interest include business establishments (e.g., coffee shops, cafes, restaurants, bike shops), restrooms, scenic locations, and parks. In various embodiments, at least a subset of venues corresponding to the stop events is selected and designated as "top venues." For example, top venues may comprise the most popular venues at which athletes stop.

For purposes of illustration, GPS data will be used as the example type of location data that is associated with a user activity and/or a POI/venue in the remainder of this application, although other examples of location data can be used in actual implementation of the techniques described herein.

FIG. 1 is a diagram showing a system for determining top venues from aggregated user activity location data in accordance with some embodiments. In the example, system 100 includes device 102, user activity data aggregation server 106, network 108, third party data server 104, and top venues server 110. Network 108 may include high-speed data networks and/or telecommunication networks.

Device 102 is a device that can record GPS data and/or other data associated with an athlete user activity. Device 102 can also be a device to which GPS data and/or other data associated with a physical activity can be uploaded or transferred. Examples of device 102 include, but are not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800, 810, and 1000), a mobile phone, such as a smart phone (e.g., an Android®-based device or Apple iPhone® device) including a GPS recording application (e.g., MotionX®, Endomondo®, Strava®, and RunKeeper®), a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 102 (or an activity tracking application executing thereon) is configured to record GPS data and auxiliary data associated with a user activity during the activity. For example, auxiliary data associated with a user activity may include physiological, environmental, and/or performance data. In some embodiments, device 102 is configured to receive recorded GPS data and auxiliary data associated with a user activity subsequent to the completion of the activity (e.g., such information is uploaded to device 102).

In some embodiments, a "user activity" refers to an instance of an athletic performance. Example types of a user activity include cycling, running, and skiing. In some embodiments, GPS data includes a series of consecutive and discrete GPS data points (e.g., latitude and longitude coordinates sometimes referred to as "Lat-Lng Data") with a timestamp for each point. In some embodiments, auxiliary data includes, but is not limited to, barometric data (e.g., elevation data), heart rate, power/watts (e.g., energy expended), time, speed (e.g., average and/or maximum speed per segment and/or route, in which average speed, for example, can be derived from time and GPS information), and/or cadence. Auxiliary data can be recorded at various granularities. For example, auxiliary data can correspond to each GPS data point, the entire activity (e.g., the auxiliary data includes averages of the metrics), and/or portions of the activity. As an example, one can use device 102 on a bike ride. At the end of the bike ride, the user can review his performance with the recorded GPS data (e.g., through a user interface of device 102) to observe the geographical track that he traversed, how much energy he expended along the ride, how fast he finished it in, average speed, elevation-based metrics, and/or other metrics. In some embodiments, device 102 is configured to store the recorded GPS data and the auxiliary data and/or send the recorded data associated with a user activity to user activity data aggregation server 106. In some embodiments, device 102 is configured to send the recorded data associated with a user activity to user activity data aggregation server 106 during the user activity (e.g., in real-time) and/or after the user activity has been completed. In some embodiments, device 102 is configured to present an interactive user interface (e.g., through an activity tracking application executing at device 102). The user interface may display GPS data and receive selections (e.g., made by a user) with respect to the displays. In some embodiments, device 102 sends the selections that it receives to top venues server 110.

In some embodiments, a user interface may be presented at device 102. In some embodiments, the user interface may be presented by top venues server 110 through an associated activity tracking application executing at device 102 or by another component that is not shown in the example of FIG. 1. In some embodiments, the user interface is configured to receive user inputs such as a confirmation of (e.g., a check-in at) a venue associated with a stop event in a completed or ongoing (e.g., current) user activity. In some embodiments, the user interface is configured to receive user inputs such as a search query for venues in a particular geographic area. The user inputs received at device 102 are configured to be sent to top venues server 110.

User activity data aggregation server 106 is configured to aggregate recorded user activity data from devices such as device 102. In some embodiments, the recorded user activity data received at user activity data aggregation server 106 is received during the user activities (e.g., in real-time) and/or subsequent to the completion of the user activities. User activity data aggregation server 106 is configured to store information associated with each user activity. For example, information associated with each user activity includes an identifier associated with the athlete that performed the activity, the activity type associated with the activity, the date and/or period of time during which the activity took place, the device type that was used to record the activity data, and the equipment used by the athlete during the activity. In some embodiments, the information associated with each user activity may include attributes associated with the user activity that were input by a user and/or attributes associated with the user activity that were inferred from the recorded data. In some embodiments, the information associated with each activity is stored by user activity data aggregation server 106 in an activity table that comprises an SQL database. User activity data aggregation server 106 is configured to store the set of GPS data (e.g., a set of GPS/Lat-Lng data points) and a corresponding auxiliary data (e.g., barometric/elevation data, timestamps, watts, heart rates, power, etc.) associated with (e.g., recorded GPS data point along) each user activity. In some embodiments, the set of GPS data and a corresponding set of auxiliary data associated with each user activity are stored by user activity data aggregation server 106 in a virtual hard drive (e.g., Amazon Simple Storage Service) associated with dynamically expanding storage availability. User activity data aggregation server 106 is configured to process the data received for each user activity and perform spatial indexing for each user activity based on the set of GPS data associated with the user activity. In some embodiments, in performing spatial indexing, the information from the activity table and the GPS and corresponding auxiliary data from the virtual hard drive are put together and recorded for each recorded GPS data point and put into a PostGIS database or other spatially enabled and indexed data structure. User activity data aggregation server 106 is configured to send the aggregated user activity data to top venues server 110.

Top venues server 110 is configured to receive the aggregated user activity data from user activity data aggregation server 106. Top venues server 110 is configured to analyze each user activity and determine one or more stop events from the user activity. As mentioned above, in various embodiments, a "stop event" comprises an event (e.g., comprising one or more GPS points and corresponding timestamps) in the user activity that meets criteria associated with stopping. For example, a stop event may occur at the start of a user activity, the end of the user activity, and one or more times during the middle of the user activity (in between the start and end of the user activity). In some embodiments, the criteria associated with an event being a stop event is a portion of the user activity in which the speed of the user activity is below 1 meter per second for at least five minutes and no traveling more than 50 meters from the start of the event. If these conditions are met, the event is considered intentional and logged as a stop event along with the GPS data (e.g., Lat-Lng data points associated with the location of the stop event), the time of day, elapsed time from the start of the track (e.g., user activity), and the length of the stop event.

In various embodiments, top venues server 110 is configured to compare the stop events determined from the aggregated user activities with a POI dataset to determine which stop events are associated with GPS data that corresponds to the GPS data associated with which POI. In various embodiments, a POI dataset comprises at least a set of venues, GPS data associated with each venue, and, optionally, metadata associated with each venue (e.g., such as the category associated with each venue). As mentioned above, in various embodiments, a "venue" comprises a point of interest (POI). Examples of points of interest include coffee shops, bike shops, cafes, restaurants, restrooms, scenic locations, and parks. In some embodiments, top venues server 110 is configured to query a third party server such as third party server 104 that stores a POI dataset to determine the venues that can be attributed to the stop events. In some embodiments, top venues server 110 is configured to store a local POI dataset and can use the locally stored POI dataset to determine the venues that can be attributed to the stop events.

In some embodiments, top venues server 110 is configured to receive user inputs that identify the venue of one or more stop events. For example, the athletes are enabled to directly attribute the venue of a stop event in real-time during an ongoing user activity and/or after uploading the completed user activity by inputting into an input field to a question (e.g., "Why did you stop here?") presented through a user interface of an activity tracking application that is executing at a device such as device 102.

Top venues server 110 is configured to store the venues that correlate to the determined stop events. In various embodiments, the number of stop events that are attributed to each venue is determined. In various embodiments, top venues server 110 is configured to score each venue based at least in part on the number of stop events that are attributed to the venue. For example, a venue that correlates to more stop events is more popular than and will therefore be scored higher than a venue that correlates to fewer stop events. In various embodiments, top venues server 110 is configured to rank the venues by score.

In various embodiments, top venues server 110 is configured to categorize the venues based on the time associated with the stop events that are attributed to the venues. For example, the venues can be categorized by day of week, time of day, and/or time of year. In some embodiments, top venues server 110 is configured to categorize the venues based on the geographic area associated with the stop events that are attributed to the venues. In some embodiments, top venues server 110 is configured to determine venues associated with the time associated with the stop events that are attributed to the venues and/or the geographic area associated with the venues. For example, top venues server 110 can determine popular venues for a specified day of week, time of day, time of year, and/or a given time interval for a specified geographic area. In some embodiments, top venues server 110 is configured to present venues at their respective locations in a given geographic area on a map interface (e.g., displayed at device 102).

In some embodiments, top venues server 110 is configured to store additional metadata with the user activities received from user activity data aggregation server 106 to annotate the user activities with the one or more venues that are attributed to each stop event of each user activity. In some embodiments, top venues server 110 is configured to analyze the user activities attributed with venues at the respective stop events to determine whether two or more athletes appear to be performing user activities belonging to a group activity. In various embodiments, a "group activity" comprises a scenario in which multiple athletes perform user activities along a similar geographic path and also have stop events at the same top venue(s). For example, two or more athletes can be inferred to be moving as a group through monitoring the patterns of the venues at which they have associated stop events and the times at which they have stop events at the venues. In some embodiments, time patterns may be determined for identified group activities. In some embodiments, top venues server 110 is configured to categorize group activities by their various attributes such as the route, e.g., distance, elevation gain, terrain (road/dirt) and/or by the demographics of the group, such as average age, average speed, and gender ratio, for example. In some embodiments, top venues server 110 is configured to suggest group activities to athletes based on attributes associated with the group activities and those associated with the athletes.

In some embodiments, top venues server 110 is configured to analyze the user activities annotated with venues and are associated with an individual athlete across multiple units of time to determine tour activities. In some embodiments, a "tour activity" comprises a trip that spans multiple units of time. For example, if each unit of time is a day, then a tour activity is a multi-day trip and involves stopping an activity at night and resuming the activity the morning of a later day. For example, circumnavigating an island over the course of a week may be a tour activity. In some embodiments, top venues server 110 is configured to suggest tour activities to athletes based on attributes associated with the tour activities and those associated with the athletes.

By leveraging aggregating user activity location data, top venues server 110 is able to detect patterns of recorded movement of athletes to infer the popular venues for athletes in each of various areas—the most popular coffee shops and vista points where cyclists pause (for a coffee or view) during their activities, for example. Analyzing patterns of movement improves the detection of the actual locations at which athletes stop, at the beginning, middle, and/or end of their athletic activities without requiring any manual input of user stopping behavior.

Figure 2:
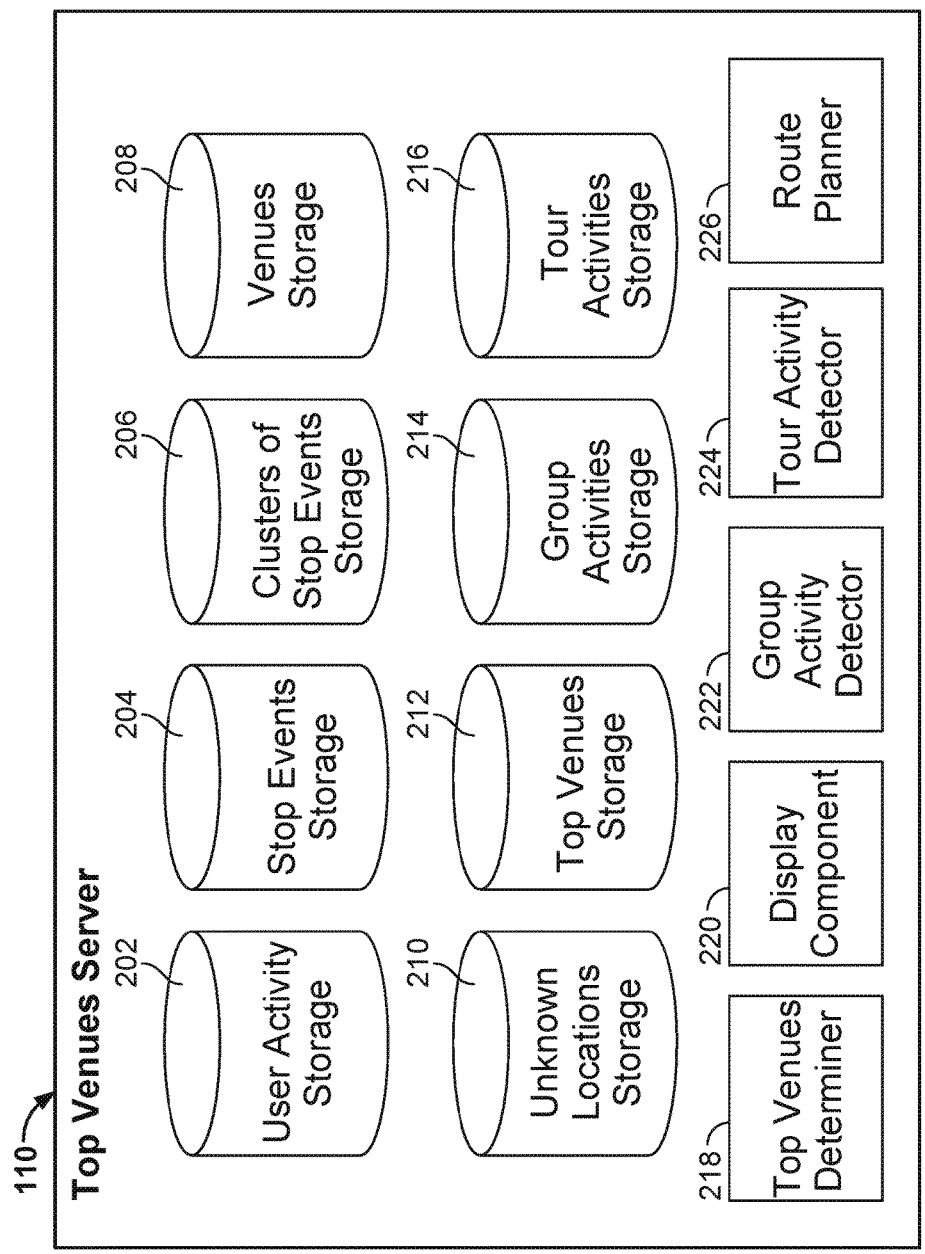
FIG. 2 is a component diagram showing example components of a top venues server in accordance with some embodiments.

FIG. 2 is a component diagram showing example components of a top venues server in accordance with some embodiments. In some embodiments, top venues server 110 of system 100 of FIG. 1 may be implemented with the example of FIG. 2. In the example, the top venues server comprises user activity storage 202, stop events storage 204, clusters of stop events storage 206, venues storage 208, unknown locations storage 210, top venues storage 212, group activities storage 214, tour activities storage 216, top venues determiner 218, display component 220, group activity detector 222, tour activity detector 224, and route planner 226. User activity storage 202, stop events storage 204, clusters of stop events storage 206, venues storage 208, unknown locations storage 210, top venues storage 212, group activities storage 214, and tour activities storage 216 may be implemented as one or more databases (e.g., MySQL databases). Each of top venues determiner 218, display component 220, group activity detector 222, tour activity detector 224, and route planner 226 can be implemented, for example, as distinct or integrated software components, which can include module(s), package(s), and/or other distinct or integrated sub-components to provide an executable computer program that can perform these described functions when executed on a processor, and can be implemented using a programming language such as Go, Java, Python, Objective C, and/or other programming languages. An example hardware computing environment to execute the components of FIG. 2 includes a cloud computing service, such as Amazon's Web Services.

Top venues determiner 218 is configured to determine top venues that are associated with stop events from the aggregated GPS data of user activities. In some embodiments, top venues determiner 218 is configured to analyze the user activities stored at user activity storage 202 and/or elsewhere (e.g., at a separate server, such as user activity data aggregation server 106 of system 100 of FIG. 1) to determine stop events from the user activities. In various embodiments, the analyzed user activities comprise the same type of user activity. Example types of user activities include running, biking, and skiing. In various embodiments, the analyzed user activities comprise user activities uploaded from GPS-enabled devices that had recorded such activities. In various embodiments, each user activity comprises a series of points annotated with corresponding GPS data, time, and optionally, auxiliary information such as performance information. Top venues determiner 218 is configured to analyze each user activity to determine events along the user activity that are stop events. As mentioned above, the criteria for being a stop event comprises an event in the user activity in which the speed is below 1 meter/second for at least 5 minutes and that the athlete does not travel more than 50 meters from the start of the event. For example, the start of a user activity, the end of the user activity, and potentially, one or more events during the middle of the user activities can be determined as stop events. Top venues determiner 218 is configured to store the determined stop events with their corresponding GPS data (e.g., Lat-Lng data) and time data (e.g., date, time of day, day of the week, and/or the amount of time since the start of the user activity) at stop events storage 204 and/or elsewhere.

In some embodiments, top venues determiner 218 is configured to cluster the determined stop events (e.g., stored at stop events storage 204 and/or elsewhere) based on their corresponding GPS data. Since the set of stop events worldwide may be large (e.g., there could be 400+ million stop events to analyze), they are clustered to build a preliminary, much smaller, set of popular stop locations. In some embodiments, clustering is done using a basic hierarchical clustering approach. In the hierarchical clustering approach, the technique loops over subregions, each with a much smaller number of points. In some embodiments, the technique tiles the world into 4 kilometer by 4 kilometer regions. The stop events are loaded for each tile region. Initially, each stop event becomes its own cluster. Then the two closest clusters are successively merged until there are no clusters within 30 meters of each other, for example. When clusters are merged, the new cluster contains the events of both clusters and the cluster center is determined by the centroid of all the stop events. Top venues determiner 218 is configured to store the clusters of stop events at clusters of stop events storage 206 and/or elsewhere.

Top venues determiner 218 is configured to attribute venues to the determined stop events. In some embodiments, top venues determiner 218 is configured to compare the GPS data corresponding to the determined stop events to a POI dataset and a venue is attributed to each stop event based on the GPS data of the stop event matching that the venue. In some embodiments, the POI dataset is stored at venues storage 208. In some embodiments, the POI dataset is stored at a third party server. As mentioned above, in various embodiments, a POI dataset comprises at least a set of venues, GPS data associated with each venue, and, optionally, metadata (e.g., name, category, and popularity) associated with each venue. In some embodiments, different POI datasets may include different venues and/or other information depending on the activity type of the user activities from which the stop events were derived. For example, if the user activities were bike rides, then the POI dataset would include venues such as coffee shops, bakeries, convenience store, bike shops and vista points, at the very least. In some embodiments, top venues determiner 218 is configured to attribute venues to stop events based on user input confirmations (e.g., check-ins) of venues at the stop events. For example, during an ongoing user activity or after the completion of the user activity, the athlete may indicate (e.g., via a user interface of an activity tracking application) a venue associated with each stop event of the user activity. In some embodiments, top venues determiner 218 is configured to compare the GPS data of each cluster of stop events (e.g., with at least five stop events) to the POI dataset to determine a set of nearby, one or more candidate venues for each cluster. One advantage to comparing the GPS data of clusters of stop events instead of the GPS data of individual stop events to the POI dataset is that the number of lookups needed for clusters is dramatically lower.

In some embodiments, in the event that one or more candidate venues were attributed to each cluster of stop events, top venues determiner 218 is configured to match each stop event in a cluster of stop events to the closest candidate venue of the set of one or more candidate venues that matched the cluster. For example, if a cluster of stop events matched candidate Venue A and candidate Venue B, then stop event 1 from the cluster would be matched with the closest venue of between candidate Venue A and candidate Venue B. In some embodiments, if there is no candidate venue within 100 meters of a stop event, then the stop event is discarded.

In some embodiments, in the event that clusters were compared to the POI dataset, top venues determiner 218 is configured to mark those clusters of stop events that are beyond a predetermined distance away from a known venue in the POI dataset as known locations. For example, the predetermined distance can be 500 meters. For example, the POI dataset used may not be complete so a cluster of stop events may not match a venue in the POI dataset. The aggregate information regarding these unknown locations and their associated stop events may also be computed, in some embodiments.

In some embodiments, in the event that one or more candidate venues were attributed to each cluster of stop events, top venues determiner 218 is configured to cluster the candidate venues attributed to the stop events. Many of the venues in the POI dataset may not be realistic stop locations given the nature of the user activities and so a representative/correct venue may be determined among a cluster of candidate stop events. For example, if an athlete is on a bike ride, it is highly likely the athlete stopped at a coffee shop, but very unlikely the athlete stopped at a mattress store. Since these types of venues may be on the same block, the correct and therefore top venue needs to be determined. In various embodiments, this representative venue associated with each cluster of candidate venues is referred to as a "top venue." In some embodiments, a top venue is selected from a set of candidate venues belonging to a cluster by comparing the set of candidate venues to one or more predetermined lists. For example, a white list of venue categories is used to select an initial subset of venues from the set of candidate venues for a cluster. The white list of venue categories includes categories of venues that the athletes would most likely have stopped at. For example, if the user activities represent bike rides, then this white list would include coffee shops and bakeries, but not classrooms or mattress stores. For example, the white list is a subset of all of the categories available in the POI dataset. Then, one venue from this subset of initial venues is selected based on certain criteria to serve as the top venue for the cluster. In various embodiments, top venues determiner 218 adds the top venues corresponding to the respective clusters to top venues storage 212 (and/or elsewhere).

In various embodiments, in the event that one or more candidate venues were attributed to each cluster of stop events, top venues determiner 218 is configured to rematch each originally determined stop event from the aggregated GPS data of user activities to the determined top venues stored in top venues storage 212 (and/or elsewhere). Specifically, the GPS data associated with each originally determined stop event is compared to the GPS data of each top venue to determine the top venue that is the closest to the stop event. In some embodiments, if there are no top venues within 100 meters of a stop event, then the stop event is discarded. In some embodiments, the number of matching stop events is aggregated for each top venue to determine the total number of stop events for each top venue. In some embodiments, the unique number of users, the length of stop distribution, the time of day distribution, the day of the week distribution, the time of year distribution, and/or other distributions are determined for each top venue.

In some embodiments, top venues determiner 218 is configured to deduplicate top venues that are associated with close GPS data. For example, two separate top venues that were both found in the POI dataset are detected at the top of a mountain and should be merged since there is really only one stop location. But two popular coffee shops near each other should be kept separate and athletes are most likely stopping at both. In some embodiments, deduplication is performed by top venues determiner 218 by adapting from historical user input associated with multiple venues being duplicates of each other. In some embodiments, deduplication is performed by top venues determiner 218 based on a predetermined threshold of closeness between top venues. For example, any top venues within 500 meters of each other are considered duplicate candidates and need to be reviewed.

In various embodiments, top venues determiner 218 is configured to score and rank the top venues stored at top venues storage 212 (and/or elsewhere). In some embodiments, the score of a top venue may be determined as a function of at least the number of aggregated stop events associated with the top venue. In some embodiments, top venues determiner 218 is configured to score and rank the top venues per a given time (e.g., time of day and/or time of year). In some embodiments, to protect against bad data and outliers, any top venue with less than 10 unique users or less than 30 unique stop events can be discarded.

In various embodiments, top venues determiner 218 is configured to annotate each of the original user activities (e.g., stored at user activity storage 202 or elsewhere) from which stop events were determined with the top venues. For example, for each user activity, the top venue that is associated with each stop event of the user activity is annotated in that user activity. The top venue's annotation of each user activity is stored as metadata with the user activity in user activity storage 202, for example.

In some embodiments, top venues determiner 218 is configured to determine, in addition to "stops" or pauses associated with activities, popular locations where cyclists or runners decelerate (e.g., to a point that is short of being qualified as a stop event) or accelerate, could also be of interest. For example, finding common sections where cyclists tend to slow down (e.g., relative to sections of similar grade) could point to areas where there are safety hazards, such as rough terrain, heavy traffic, busy intersections, or traffic signals and stop signs.

Display component 220 is configured to display one or more top venues determined by top venues determiner 218 and/or stored at top venues storage 212 and/or elsewhere. In some embodiments, display component 220 is configured to display top venues at their corresponding locations on a map interface. In some embodiments, display component 220 is configured to present the map interface by querying a public API associated with a third party map service. In some embodiments, route planner 226 is configured to receive a user input of a geographic area of interest and route planner 226 is configured to determine those top venues associated with that geographic area of interest. Then, display component 220 is configured to return a map associated with the geographic area of interest with indications of one or more top venues associated with that geographic area of interest. In some embodiments, route planner 226 is configured to receive a user input associated with one or more attributes associated with a desired route and route planner 226 is configured to determine one or more routes that match the one or more attributes and also one or more top venues that are associated with the routes. Then, display component 220 is configured to return a map associated with the determined routes with indications of one or more top venues associated with those routes.

Group activity detector 222 is configured to detect group activities from the aggregated GPS data of user activities. In some embodiments, group activity detector 222 is configured to analyze the user activities stored at user activity storage 202 and/or elsewhere (e.g., at a separate server, such as user activity data aggregation server 106 of system 100 of FIG. 1) to determine user activities that form group activities. In some embodiments, group activity detector 222 is configured to analyze the user activities annotated with top venues at the respective stop events to determine whether two or more athletes appear to be performing user activities in a group. For example, two or more athletes can be inferred to be moving as a group through monitoring the patterns of the venues at which they have associated stop events and the times at which they have stop events at the venues. In some embodiments, group activity detector 222 is configured to determine time patterns for identified group activities. For example, a time pattern associated with a group activity indicates that at least some of the same member athletes of the group activity perform the group activity every Saturday morning. For example, if two or more cyclists rode nearby each other for at least a section of their respective activities, then the two or more cyclists can be inferred to be in a group. Also, for example, if a subset of athletes pause at the same destination on a weekly basis, say at Peet's Coffee at 9 am every Saturday, and then continue on together following a similar path, this suggests a weekly group ride. In some embodiments, group activity detector 222 is configured to contact at least one member athlete of a detected group activity to invite the member athlete to input more information regarding the group activity. For example, a prompt may be sent to at least one member athlete to input more information and the athlete may submit information regarding the group activity such as whether it is publicly searchable, the name of the group, the name/handles of the users that are group members, the times at which the group activity is performed, etc. In some embodiments, group activity detector 222 is configured to detect a hiatus in a regular time pattern associated with a detected group activity and may contact a third party server, such as a weather service server, for example, to determine an event (e.g., a storm) that may have caused the hiatus. In some embodiments, group activity detector 222 is configured to categorize group activities by their various attributes such as the route, e.g., distance, elevation gain, terrain (road/dirt) and/or by the demographics of the group, such as average age, average speed, and gender ratio, for example. In some embodiments, group activity detector 222 is configured to suggest group activities to athletes based on attributes associated with the group activities and those associated with the athletes.

Tour activity detector 224 is configured to analyze the user activities stored at user activity storage 202 and/or elsewhere (e.g., at a separate server, such as user activity data aggregation server 106 of system 100 of FIG. 1) to determine user activities that form tour activities. In various embodiments, a "tour activity" comprises a scenario in which an individual athlete performs a series of user activities over several units of time (e.g., days). In some embodiments, tour activity detector 224 is configured to analyze the user activities annotated with top venues to determine whether an individual athlete performed a tour activity across several units of time. For example, if each unit of time is a day, then a tour activity is a multi-day trip and involves stopping a user activity at night and resuming the user activity the morning of a later day. As such, tour activity detector 224 is configured to determine whether a top venue associated with an athlete's last stop event of a user activity performed one day is near (e.g., within a predetermined range of) the top venue associated with the athlete's first stop event of another user activity performed on the later day. In some embodiments, tour activity detector 224 is configured to suggest tour activities to athletes based on attributes associated with the tour activities and those associated with the athletes.

Figure 3:
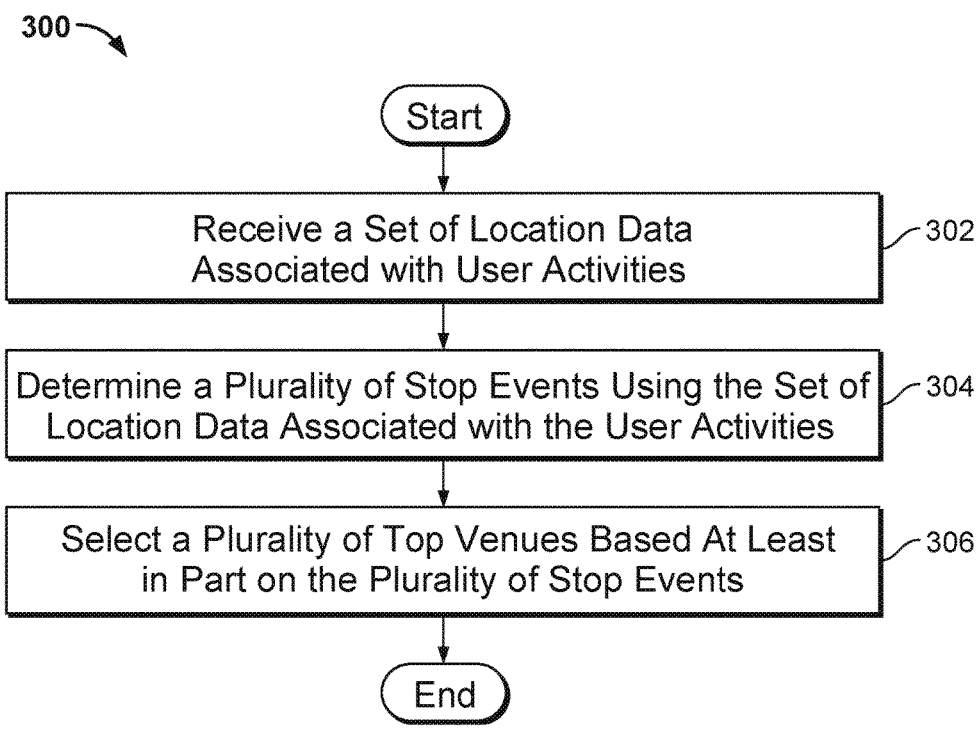
FIG. 3 is a flow diagram showing an embodiment of a process for determining top venues from aggregated user activity location data in accordance with some embodiments.

FIG. 3 is a flow diagram showing an embodiment of a process for determining top venues from aggregated user activity location data in accordance with some embodiments. In some embodiments, process 300 is implemented at system 100 of FIG. 1. In particular, process 300 is implemented at top venues server 110 of system 100.

At 302, a set of location data associated with user activities is received. User activities comprise recorded instances of athletic performances. The user activities may be associated with a certain type of activity such as cycling, running, or skiing, for example. Each user activity is recorded as a collection of positions annotated with a time, location (e.g., GPS data), and optionally other information (e.g., performance data such as speed, power, and/or heart-rate).

At 304, a plurality of stop events is determined using the set of location data associated with the user activities. In various embodiments, the recorded location (e.g., GPS) data (and the corresponding time data) of each user activity is analyzed to determine stop events associated with the user activity. In various embodiments, each stop event is a portion (comprising one or more points) in the user activity that meets criteria associated with stopping. In various embodiments, a stop event is associated with at least corresponding location (e.g., GPS) data, start and/or end times, and duration. For example, the start of the user activity may be determined as a stop event, the end of the user activity may be determined as a stop event, and, potentially, one or more middle portions of the user activity may be determined as stop events.

At 306, a plurality of top venues is selected based at least in part on the plurality of stop events. The location (e.g., GPS) data of the stop events determined from the set of user activities is compared to a POI dataset, which includes data associated with various venues, to determine venues that match the stop events. At least some of the venues that have been determined to match the stop events are selected as top venues. Top venues may be presented on a map interface, ranked, sorted, used for routing, used to determine group activities among the user activities, and/or used to determine tour activities among the user activities, for example.

Figure 4:
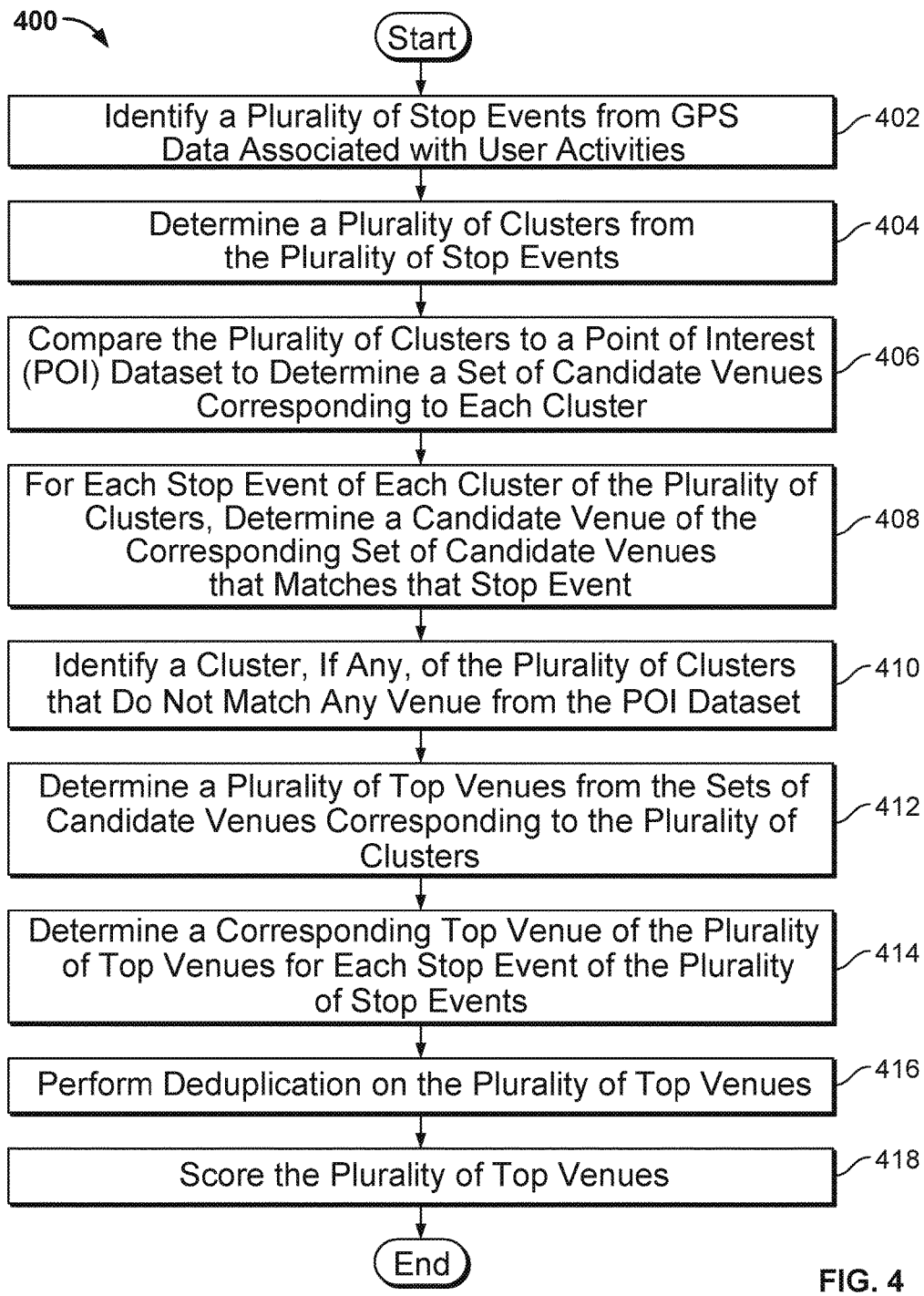
FIG. 4 is a flow diagram showing an example of a process for determining top venues from aggregated user activity location data in accordance with some embodiments.

FIG. 4 is a flow diagram showing an example of a process for determining top venues from aggregated user activity location data in accordance with some embodiments. In some embodiments, process 400 is implemented at system 100 of FIG. 1. In particular, process 400 is implemented at top venues server 110 of system 100. In some embodiments, steps 304 and 306 of process 300 of FIG. 3 are implemented using process 400.

At 402, a plurality of stop events is identified from GPS data associated with user activities. Each user activity is recorded by a single user and includes an ordered set of GPS points, which is sometimes referred to as a "track." The user activity provides the location and time the user was at each GPS point. The GPS and time information associated with a user activity may be used to derive the athlete's speed at each location of the user activity. Each user activity is analyzed to determine one or more stop events.

Since GPS data can be noisy/jittery, it is not possible to simply look for repeated locations in the GPS data of a user activity. Thus, in some embodiments, sections of a track where the user was almost stopped, or stayed within a small area for a period of time, are looked for to determine stop events. In some embodiments, the technique starts by iterating through the GPS data of a user activity looking for a location where the user was moving slower than 1 meter/second. Once such a location is found, it is marked and considered as the start of the potential stop event. To qualify as a true, intentional, stop event, in one example, the athlete must keep their speed below a predetermined speed (e.g., 1 meter/second) for at least a predetermined period of time (e.g., 5 minutes) and not travel more than a predetermined distance (e.g., 50 meters) from the start of the stop. If these criteria are met, then the stop event is considered intentional and logged along with the time of day, elapsed time from the start of the track, and the length of the stop. The whole set of GPS data of a user activity is analyzed in this same manner as an athlete may stop at multiple locations, or multiple times at a single location, in a given athletic performance. The start and end of the GPS tracks are also marked as stop events as those locations may indicate good locations to start from or finish at.

At 404, a plurality of clusters is determined from the plurality of stop events. Since the set of stop events worldwide may be large, in some embodiments, the stop events are clustered to build a preliminary, much smaller, set of popular stop locations. In some embodiments, clustering is done using a hierarchical clustering with pre-bucketing approach. Since clustering around 400+ million stop events can be time consuming, the technique loops over subregions, each with a much smaller number of stop events. In some embodiments, the technique currently tiles the world into 4 kilometer by 4 kilometer regions, although subregions of different dimensions may be used as well. The stop events are loaded for each tile region. Initially, each stop event becomes its own cluster. Then the two closest clusters are successively merged until there are no clusters within 30 meters (or another predetermined distance) of each other. When clusters are merged, the new cluster contains the stop events of both merged clusters and the new cluster center is determined by the centroid of all the stop events.

At 406, the plurality of clusters is compared to a point of interest (POI) dataset to determine a set of candidate venues corresponding to each cluster. In some embodiments, the clusters of stop events are compared to a POI dataset to determine why the athletes stopped where they did. In some embodiments, the GPS data corresponding to clusters is compared to the POI dataset, which comprises venues and their corresponding GPS data, to determine a set of venues that are nearby each cluster of stop events. The venues nearby a cluster of stop events are referred to as "candidate venues." In some embodiments, the POI dataset comprises a third party dataset that is accessible via a public API associated with the third party. Examples of third party POI datasets include Foursquare® and Google Places™. In some embodiments, different POI datasets may be used for stop events derived from user activities of different types. For example, different POI datasets may be used for stop events associated with biking and running. For example, if the GPS tracks were bike rides, the POI dataset should include coffee shops, bakeries, convenience stores, bike shops and vista points, at the very least.

In some embodiments, each cluster with at least a predetermined number (e.g., five) of stop events is looked up in the POI dataset and a set of nearby venues is returned. One advantage provided by clustering stop events is that querying for nearby venues for each cluster of stop events dramatically reduces the number of lookups that would otherwise be needed to query for nearby venues for each individual stop event. The venues are stored along with any relevant data such as the name, category and popularity.

At 408, for each stop event of each cluster of the plurality of clusters, a candidate venue of the corresponding set of candidate venues that matches that stop event is determined. Each originally computed stop event belonging to each cluster of stop events is matched to its closest candidate venue of the set of candidate venues that have been determined to match that cluster. For example, Cluster A includes Stop Event 1 and Stop Event 2. Cluster A has been determined to match two candidate venues, a coffee shop and a bike shop. The GPS data of each of Stop Event 1 and Stop Event 2 are compared to those of the coffee shop and the bike shop and it is determined that Stop Event 1 is closer to the coffee shop and Stop Event 2 is closer to the bike shop.

In various embodiments, the number of stop events that match each candidate venue associated with each cluster is determined. In some embodiments, a stop event that is not within 100 meters of a candidate venue associated with the cluster to which it belongs is discarded.

At 410, a cluster, if any, of the plurality of clusters that do not match any venue from the POI dataset is identified. The POI dataset used above to determine venues matching the stop events may be incomplete. As such, any clusters that are not within a predetermined distance (e.g., 500 meters) of a venue from the POI dataset are stored and marked as unknown locations. The aggregate information about these unknown locations may also be computed.

At 412, a plurality of top venues is determined from the sets of candidate venues corresponding to the plurality of clusters. At least some of the venues pulled in from the POI dataset may not be realistic stop locations given the activities represented by the original GPS traces. For example, if an athlete is on a bike ride, it is highly likely the athlete stopped at a coffee shop, but very unlikely the athlete stopped at a mattress store. Since these types of venues may be on the same block, the correct venues need to be determined from the sets of candidate venues that have been matched to the clusters of stop events.

In various embodiments, the sets of candidate venues that have been determined to match the clusters of stop events are clustered. In some embodiments, this technique tiles the world into 4 kilometer by 4 kilometer regions, although subregions of different dimensions may be used as well, and each region may be addressed one at a time. Since there will be issues with tile boundary overlap, in some embodiments, the region is expanded by 50 meters on all sides. Candidate venues that were considered previously are marked and omitted from any following tiles. The remaining venues are then clustered to a threshold or 50 meters using the same technique that was described for clustering stop events in step 404. For each cluster of candidate venues, a representative venue is determined. A tiered approach may be used. In some embodiments, first, a subset of the venues in each cluster of candidate venues is chosen and then the representative venue is selected from the subset. For example, the subset is chosen from each cluster of candidate venues as follows: if there are candidate venues whose categories match a predetermined "white list," those candidate venues are picked as the initial subset. The predetermined "white list" includes venue categories the athletes represented by the GPS traces would most likely have stopped at. For example, if the traces represent bike rides, then the white list would include coffee shops and bakeries, but not classrooms or mattress stores. In some embodiments, a predetermined white list is a subset of the categories that is available in the POI dataset. In some embodiments, a predetermined white list comprises one or more tiers of venue categories, such that candidate venues that match the top tier of venue categories are selected to be included in the initial subset and if no candidate venues match the top tier of venue categories, then those candidate venues that match the next tier of venue categories are selected, and so forth. The following includes venue categories that can be included in an example predetermined white list:

Top tier grade A="Bike," "Bike shop," "Sporting Goods," "Bakery," "Deli/Bodega," "Coffee Shop," "Café"

Second tier grade B="Gourmet," "American," "Cafeteria," "Convenience Stores," "Gas Station/Garage," "Market," "Farmer's Market," "Grocery Store," "Supermarket," "Sandwiches," "Burgers," "Bar," "Pub," "Scenic Lookout," "Mountain," "Lake," "Sculpture," "Golf Course," "Disc Golf," "Park," "Baseball Field," "Field," "Other Outdoors," "Art Museum," "Beach"

In the example predetermined white list above, there are two tiers of venue categories. The two tiers of venue categories can be used as follows: if any candidate venue from a cluster of candidate venues matches one or more venue categories from the grade A top tier, then those candidate venues are selected and included into the initial subset of candidate venues. However, if no candidate venues from the cluster of candidate venues matches one or more venue categories from the grade A top tier, the cluster of candidate venues are compared against the venue categories of the grade B second tier to find any matches.

A selection of a representative venue, which is sometimes referred to as a "top venue," is then made from this initial subset for each cluster. In one example of such a selection, the candidate venue that is the most popular among the subset of candidate venues (e.g., as indicated in the third party POI dataset, if one was used) is selected. In another example of such a selection (e.g., in the event that the popularity of venues in the third party POI dataset proved inconclusive), the candidate venue with the most stop events is selected. In some embodiments, if there are candidate venues with stop events counts within 10% percent of popularity as each other, they are all selected as representative/top venues. Duplicate, or nearby top venues, can be handled later.

In some embodiments, a representative/top venue is selected from the complete list of candidate venues associated with a cluster of candidate venues.

In some embodiments, a black list of venue categories may be used to eliminate candidate venues that are unlikely to be locations that athletes stop at. The following includes venue categories that can be included in an example predetermined black list:

"Dance Studio," "Courthouse," "Real Estate," "Thrift/Vintage," "University," "Massage Studio," "Spiritual," "History Museum," "Chiropractors," "Gastropub," "Donuts," "Assisted Living," "Photography Lab," "Motel," "Women's Store," "Rental Car," "Frat House," "Pet Service," "Smoke Shop," "Office Supplies," "Nursery School," "Department Store," "Military Base," "Tanning Salon," "Credit Union," "Tattoo Parlor"

In some embodiments, the white list and/or black list can be determined based on the historical popularities (e.g., as determined by the number of associated stop events or the number of user check-ins) of venues. In some embodiments, the white list and/or black list can be determined manually.

The resulting representative venues determined from the various clusters of candidate venues are added to a "top venues" list and/or storage.

At 414, a corresponding top venue of the plurality of top venues is determined for each stop event of the plurality of stop events. In various embodiments, the stop events originally computed from the GPS tracks are remapped to their closest top venue of the list of top venues. In some embodiments, if there are no top venues within a predetermined distance (e.g., 100 meters) of a stop event, the stop event is discarded.

The stop event count is aggregated for each top venue to determine the number of total stops, the number of unique users, length of stop distribution, time of day distribution, and/or day of week distribution and time of year distribution, for example.

At 416, deduplication is performed on the plurality of top venues. Close top venues could mean an error or redundancy in the POI dataset. For example, two top venues that were both included in the POI dataset associated with locations that are close to each other at the top of a mountain should be merged since there is really only one stop location. But two popular coffee shops near each other should be kept separate and users are most likely stopping at both.

In some embodiments, the deduplication can be done manually. For example, top venues that are located within 500 meters of each other can be considered duplicate candidates and need to be reviewed. In some embodiments, the deduplication can be determined based on user feedback/input of duplicate top venues that is automatically adapted by the system.

At 418, the plurality of top venues is scored. At this point, process 400 has mapped stop events to top venues. For example, top venues may be scored based at least on the corresponding number of stop events that have been matched to each top venue to determine a popularity ranking of top venues. In some embodiments, the top venues can be filtered by category, time of day and/or time of year, and/or geographic area prior to scoring/ranking. In some embodiments, to protect against bad data and outliers, any top venue with less than 10 unique users or less than 30 unique stop events can be discarded.

Figure 5:
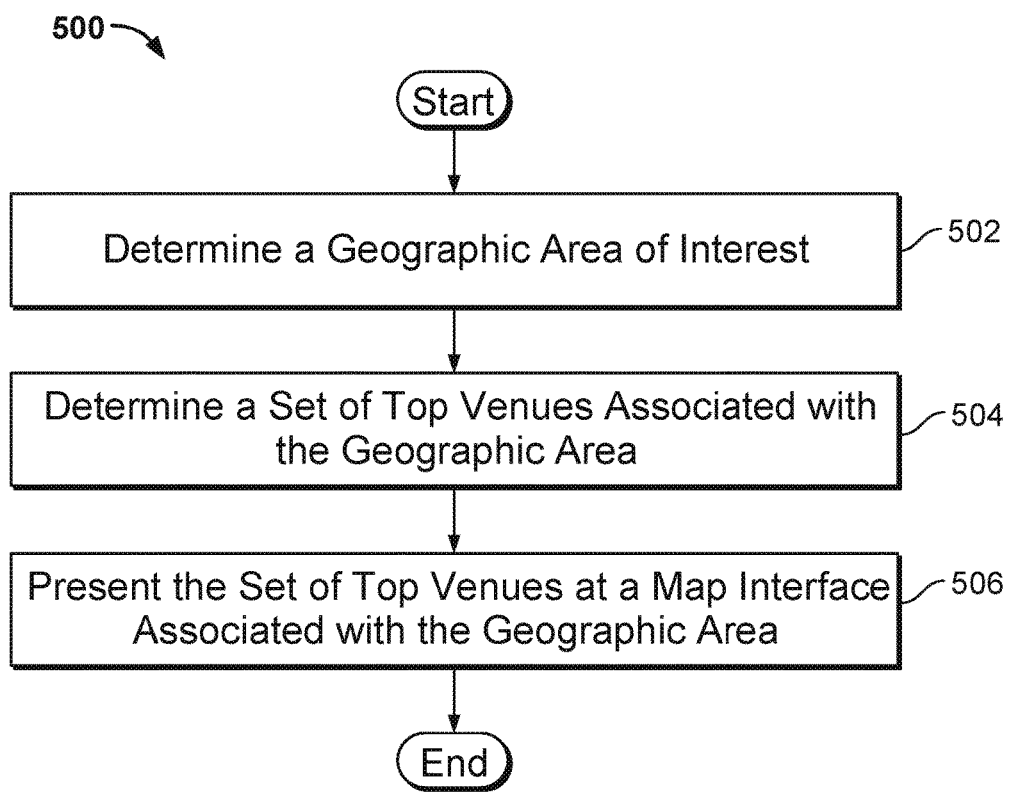
FIG. 5 is a flow diagram showing an example of a process for presenting top venues associated with a geographic area in accordance with some embodiments.

FIG. 5 is a flow diagram showing an example of a process for presenting top venues associated with a geographic area in accordance with some embodiments. In some embodiments, process 500 is implemented at system 100 of FIG. 1. In particular, process 500 is implemented at top venues server 110 of system 100.

Process 500 is an example of a process for displaying top venues on a map. In some embodiments, process 500 is performed after at least one iteration of performing process 300 of FIG. 3 or process 400 of FIG. 4.

At 502, a geographic area of interest is determined. In some embodiments, a geographic area of interest is determined based on a user input via an interface of an activity tracking application executing at a client device. In some embodiments, a geographic area of interest is determined based on a user selection of an area on a map interface.

At 504, a set of top venues associated with the geographic area of interest is determined. In various embodiments, top venues have already been determined (e.g., using a process such as process 300 of FIG. 3 or process 400 of FIG. 4, described above). The determined top venues are filtered for those that are located in the geographic area of interest.

For example, process 500 can be performed to determine the top venues associated with a certain activity type in a certain geographic area. For example, the top venues for runners in Boston can be determined using process 500.

At 506, the set of top venues is presented at a map interface associated with the geographic area of interest. The set of top venues that is determined to be located in the geographic area of interest is presented at a map interface that comprises a map of the geographic area of interest. For example, a third party map API (e.g., Google Maps™ API) can be called to present a map and each top venue can be presented at the map at its respective location on the map. In some embodiments, a display of the set of top venues as ranked by their respective popularity is also presented at the map interface. In some embodiments, additional information is presented with each top venue, such as, for example, the number of stop events that have been made at the top venue, the number of unique athletes that have stopped at the top venue, the average duration of a stop event at the top venue, a length of stop distribution, a time of day distribution, day of week distribution, and time of year distribution.

Figure 6:
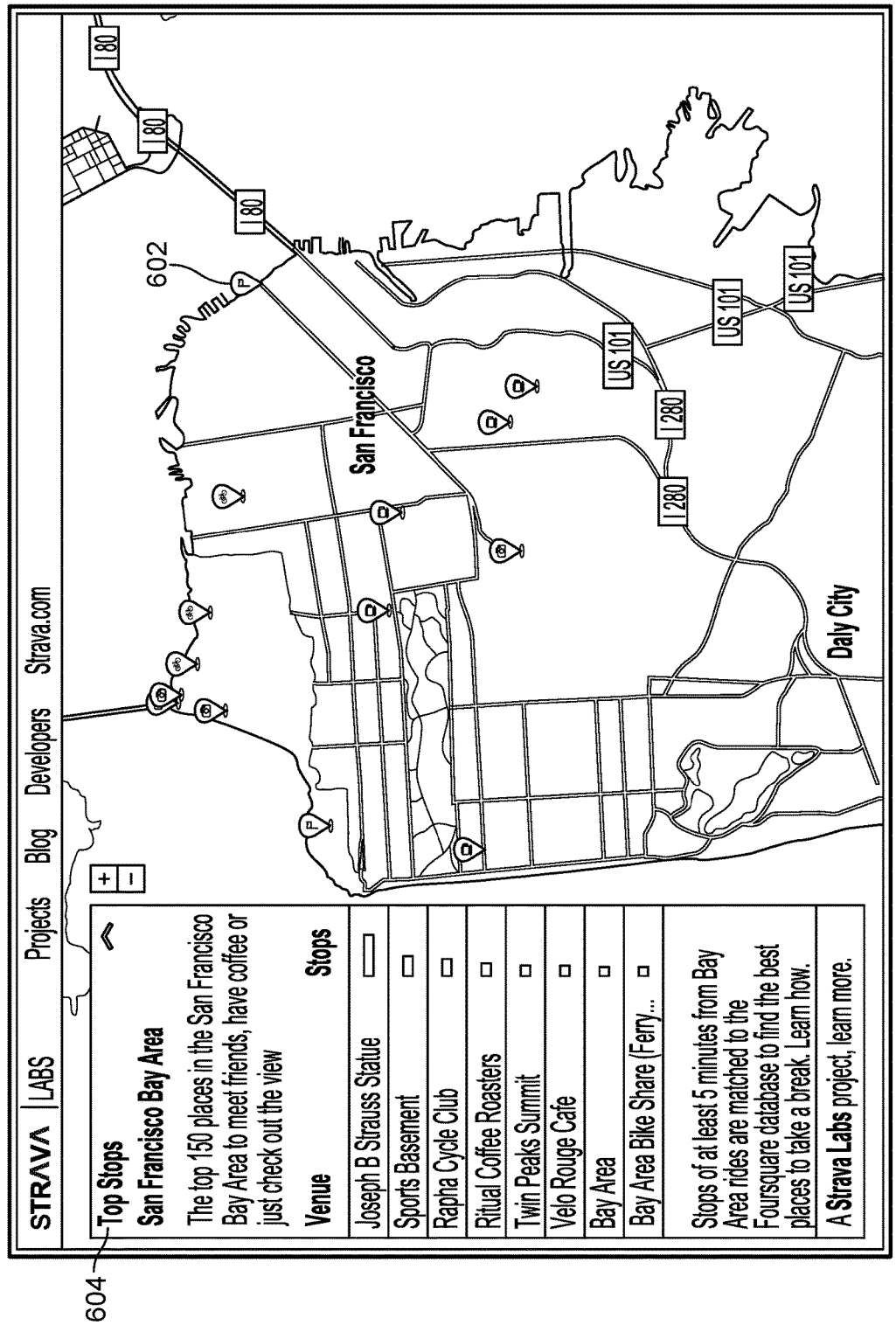
FIG. 6 is a diagram showing an example of a map interface that includes a presentation of top venues in accordance with some embodiments.

FIG. 6 is a diagram showing an example of a map interface that includes a presentation of top venues in accordance with some embodiments. In the example of FIG. 6, the map interface shows a map of the geographic area associated with San Francisco and also markers corresponding to top venues in San Francisco. Marker 602 is an example of a marker that indicates the location of a top venue on the map of San Francisco. The map interface associated with San Francisco can be presented in response to a user input to view top venues that are located in San Francisco. As such in the example, each top venue marker may also include an image associated with the category of venue (e.g., coffee shop, bike shop, scenic view, etc.) with which it is associated. Section 604 on the map interface shows a ranked list of the top venues (which are sometimes referred to as "Top Stops") that are also shown in the displayed map of San Francisco. In the example, the top venues in section 604 are ranked by their respective number of stop events.

Figure 7:
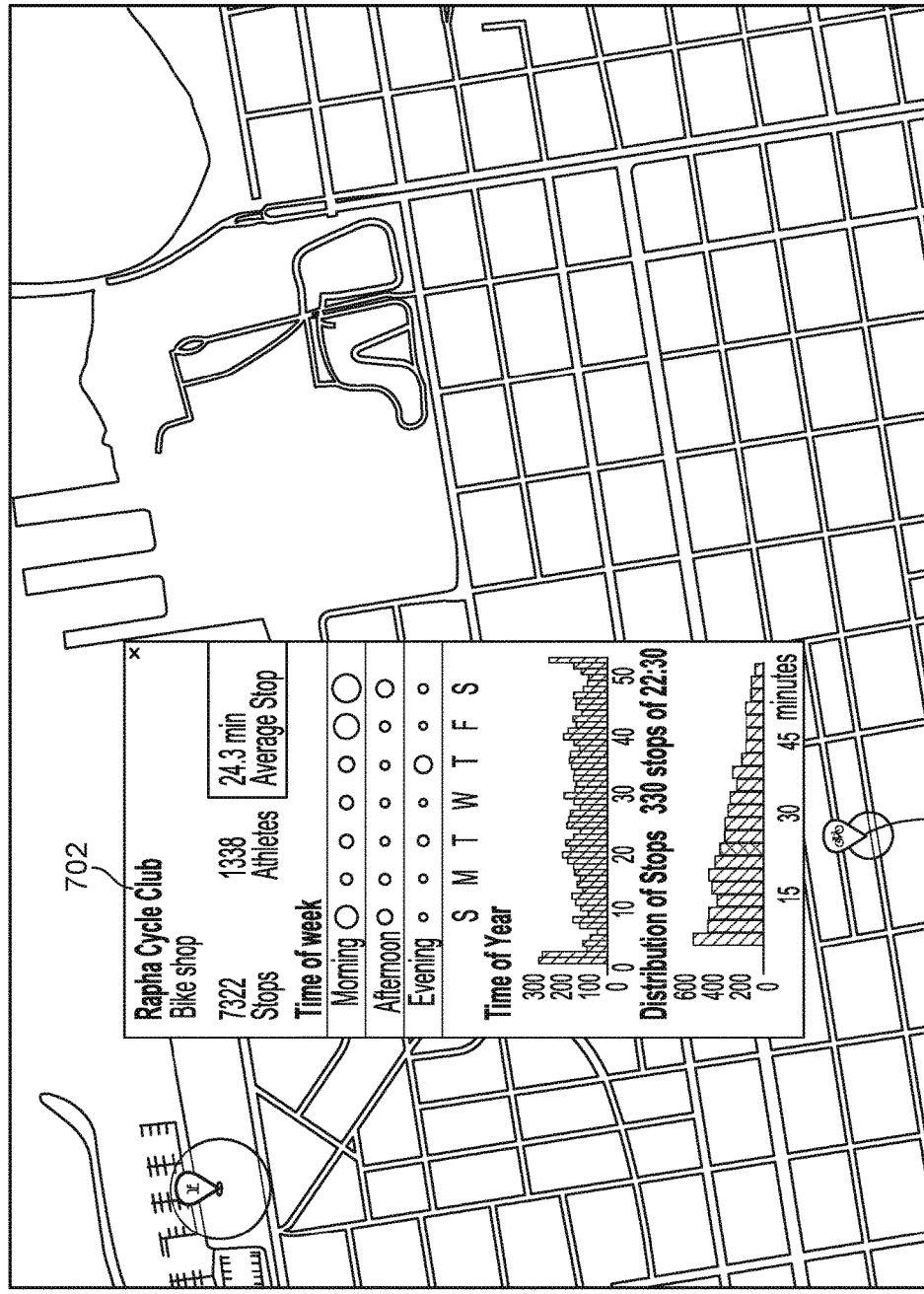
FIG. 7 is a diagram showing another example of a map interface that includes a presentation of top venues in accordance with some embodiments.

FIG. 7 is a diagram showing another example of a map interface that includes a presentation of top venues in accordance with some embodiments. In the example of FIG. 7, the map interface shows a map of the geographic area associated with San Francisco and also detailed information associated with one selected top venue marker. In the example, top venue marker 704 has been selected (e.g., by a user input) and in response, panel 702 is presented to display detailed information associated with the top venue of selected marker 704. In the example, the top venue of selected marker 704 is called "Rapha Cycle Club," is a bike shop that is associated with 7322 stop events, associated with 1338 unique athletes, and has an average stop event duration of 24.3 minutes. Additional distributions computed from the stop events associated with Rapha Cycle Club such as time and day of the week, time of the year, and the duration of the stop events are also presented in panel 702.

Figure 8:
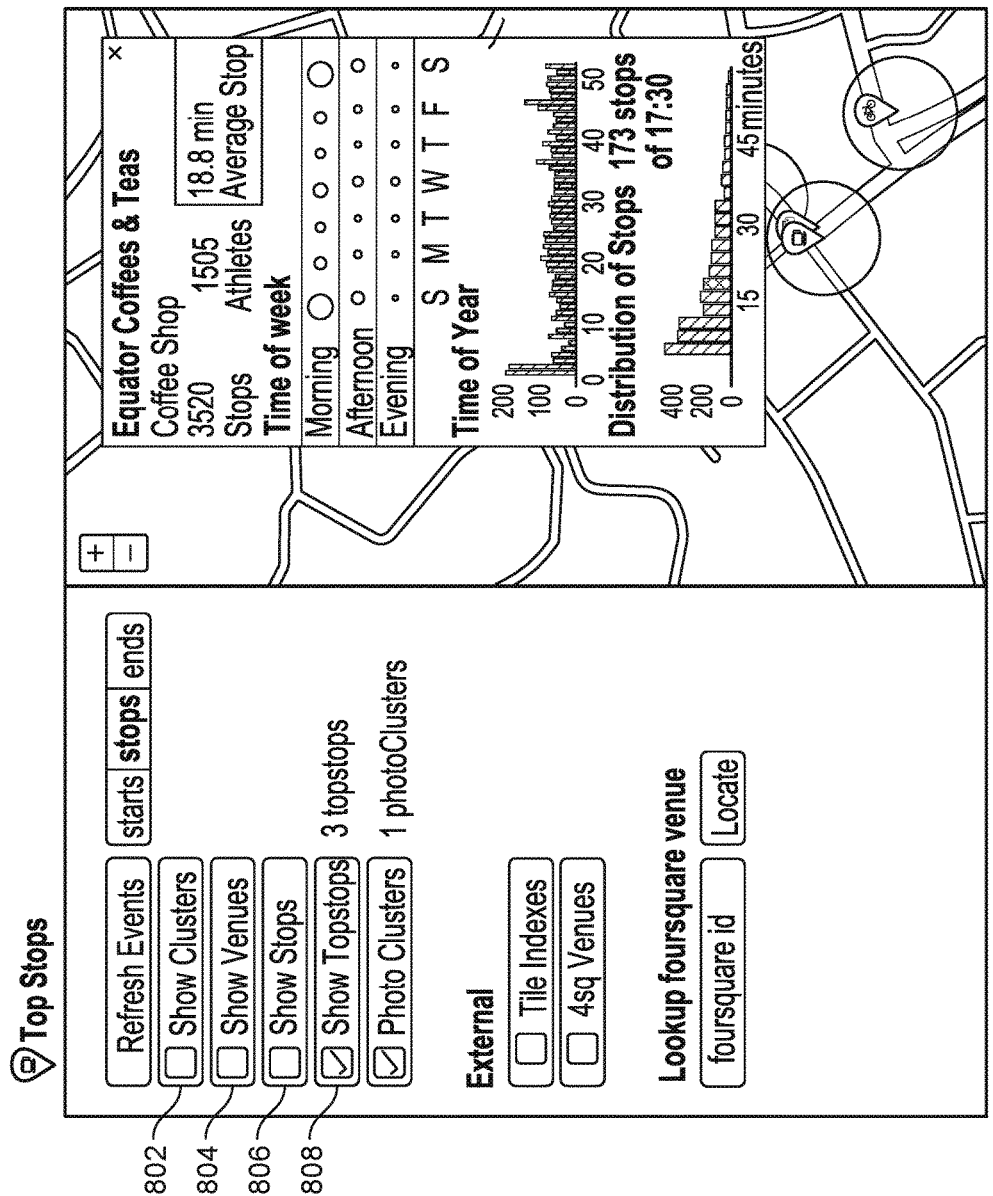
FIG. 8 is a diagram showing an example of a map interface that includes a presentation of top venues in accordance with some embodiments.

FIG. 8 is a diagram showing an example of a map interface that includes a presentation of top venues in accordance with some embodiments. In the example of FIG. 8, the map interface shows a map of the geographic area associated with Mill Valley and also detailed information associated with one selected top venue marker, as well as a menu with options to display other information related to the determination of top venues. For example, option 802, if selected, would cause clusters of stop events to be shown on the map. For example, option 804, if selected, would cause venues from a POI dataset that have been filtered to exclude those with "black listed" categories to be shown on the map. For example, option 806, if selected, would cause POI venues that have been determined to be stop locations to be shown on the map. For example, option 808, if selected, would cause the most popular stop locations in a city to be shown on the map.

Figure 9:
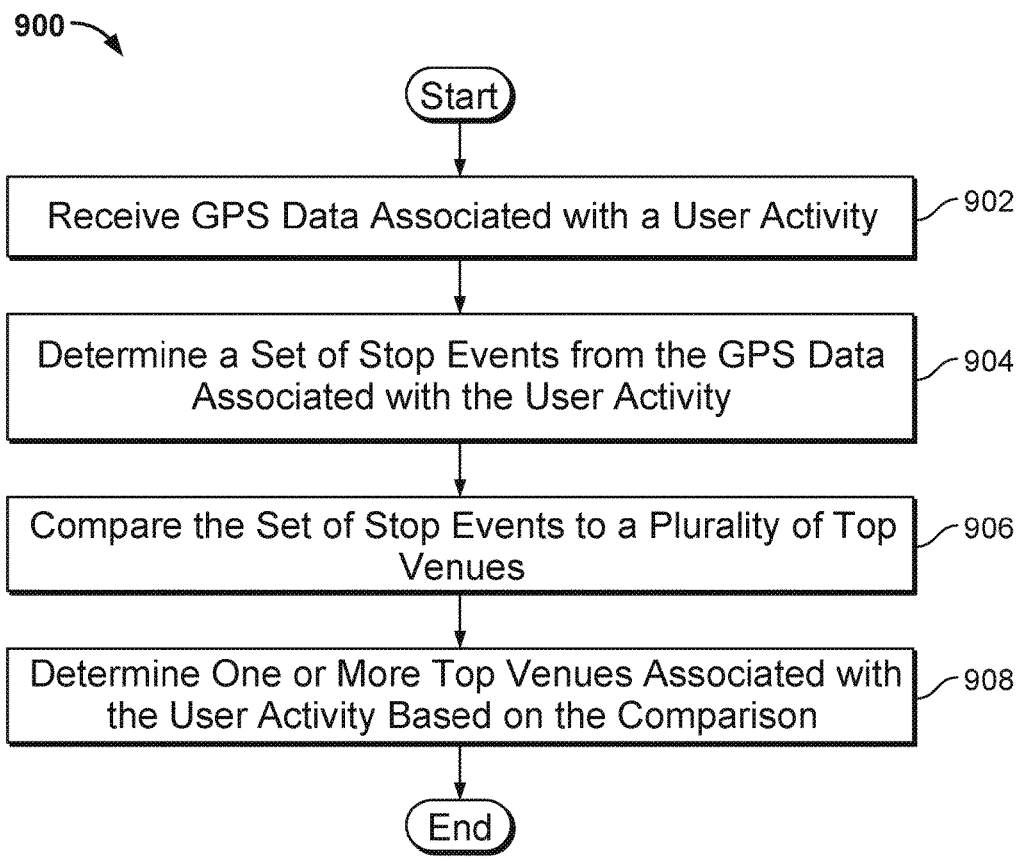
FIG. 9 is a flow diagram showing an example of a process for identifying top venues associated with stop events of a user activity in accordance with some embodiments.

FIG. 9 is a flow diagram showing an example of a process for identifying top venues associated with stop events of a user activity in accordance with some embodiments. In some embodiments, process 900 is implemented at system 100 of FIG. 1. In particular, process 900 is implemented at top venues server 110 of system 100.

Process 900 is an example of a process for identifying top venues from a user activity. For example, the user activity is uploaded from a GPS-enabled device that recorded the user activity. In some embodiments, process 900 is performed after at least one iteration of performing process 300 of FIG. 3 or process 400 of FIG. 4.

At 902, a set GPS data associated with a user activity is received. The ordered set of GPS points corresponding to time data associated with the user activity is received. In some embodiments, the user activity has completed. In some embodiments, the user activity is ongoing and the GPS and time data comprise the information recorded so far in the ongoing user activity.

At 904, a set of stop events is determined from the GPS data associated with the user activity. The set of GPS points and corresponding time data are analyzed to determine one or more stop events associated with the user activity.

At 906, the set of stop events is compared to a plurality of top venues. A set of top venues have already been determined using a process such as process 300 of FIG. 3 or process 400 of FIG. 4.

At 908, one or more top venues associated with the user activity are determined based on the comparison. The GPS data of the set of stop events is compared to data of the set of top venues to determine one or more top venues, if any, that match each stop event. The top venues that match the user activity may be stored with the user activity, in some embodiments. In some embodiments, the matching top venues will be presented to the athlete that performed the user activity for the athlete to confirm whether he or she had indeed stopped at any one or more of the matching top venues.

Figure 10:
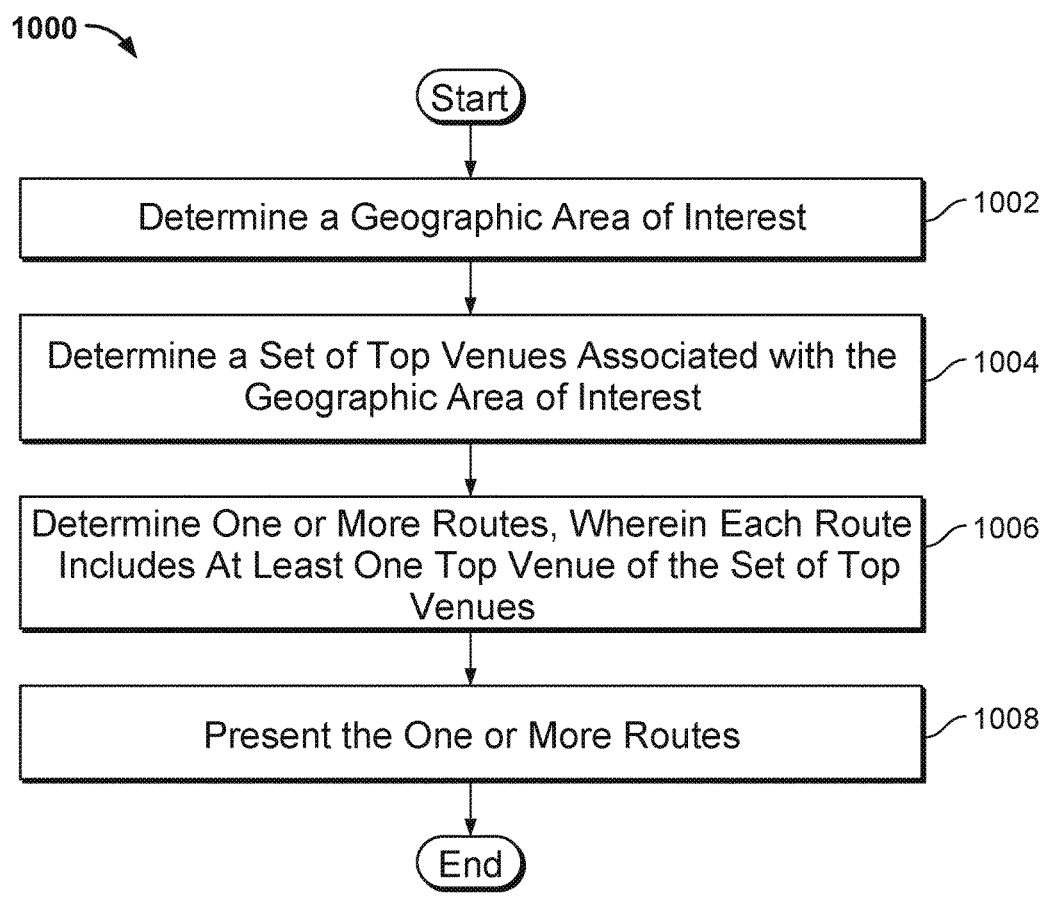
FIG. 10 is a flow diagram showing an example of a process for recommending routes associated with top venues in accordance with some embodiments.

FIG. 10 is a flow diagram showing an example of a process for recommending routes associated with top venues in accordance with some embodiments. In some embodiments, process 1000 is implemented at system 100 of FIG. 1. In particular, process 1000 is implemented at top venues server 110 of system 100.

Process 1000 is an example of a process for recommending user activity routes that include top venues associated with a geographic area of interest. In some embodiments, process 1000 is performed after at least one iteration of performing process 300 of FIG. 3 or process 400 of FIG. 4. An athlete can use a process such as process 1000 to receive help in route planning and to receive recommended routes that pass through/near top venues in a geographic area of interest for the athlete in the event that the athlete would like to use the venues as destinations during future user activities.

At 1002, a geographic area of interest is determined. In some embodiments, a geographic area of interest is determined based on a user input via an interface of an activity tracking application executing at a client device. In some embodiments, a geographic area of interest is determined based on a user selection of an area on a map interface.

At 1004, a set of top venues associated with the geographic area of interest is determined. In various embodiments, top venues have already been determined (e.g., using a process such as process 300 of FIG. 3 or process 400 of FIG. 4, described above). The determined top venues are filtered for those that are located in the geographic area of interest.

At 1006, one or more routes are determined, wherein each route includes at least one top venue of the set of top venues. In various embodiments, routes associated with one or more activity types are stored. In various embodiments, a "route" comprises a GPS track. In some embodiments, at least some routes are predetermined. In some embodiments, at least some routes are defined by users. Stored routes are searched for those that include GPS data in proximity to one or more top venues that have been determined to be located in the geographic area of interest.

At 1008, the one or more routes are presented. In some embodiments, the routes are presented at a map interface associated with the geographic area of interest. In some embodiments, the one or more top venues with which each route are associated is also indicated at the map interface.

Figure 11:
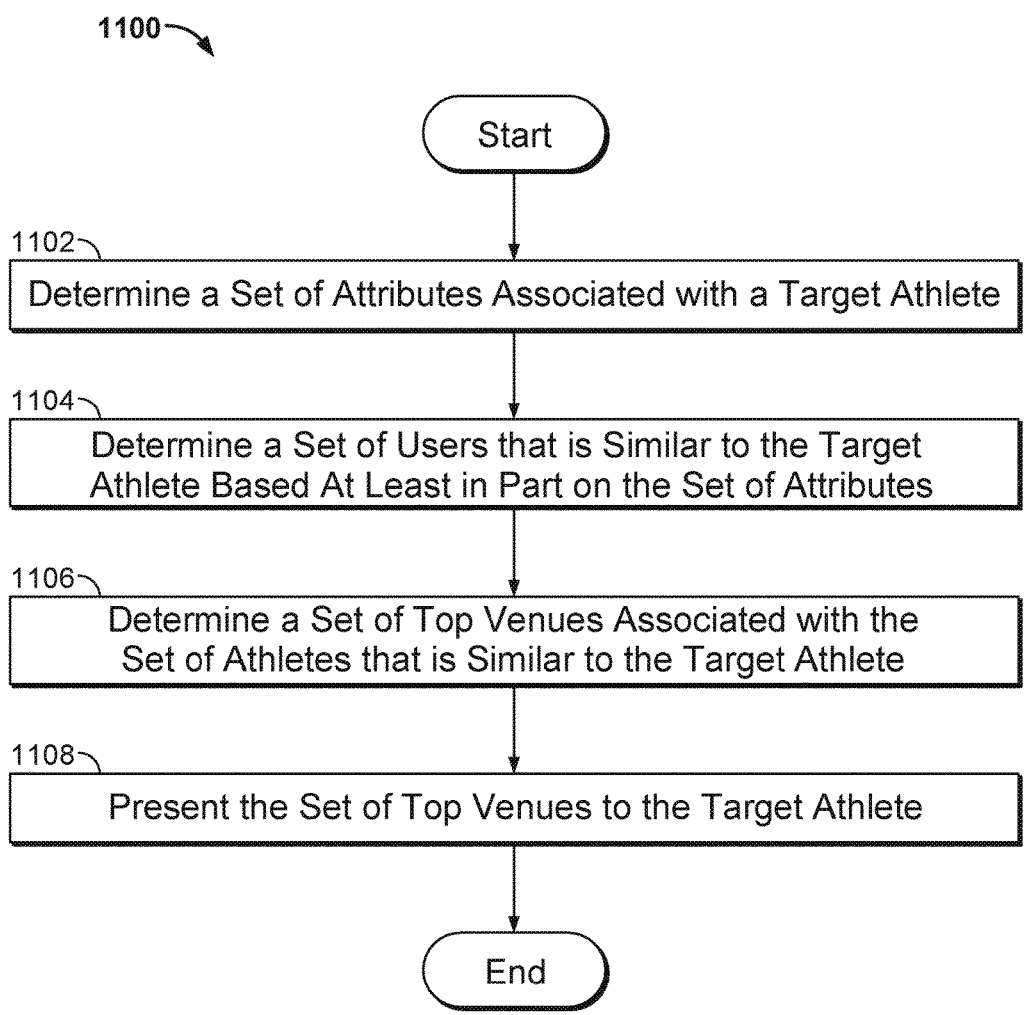
FIG. 11 is a flow diagram showing an example of a process for recommending top venues to a target athlete based on attributes of the target user in accordance with some embodiments.

FIG. 11 is a flow diagram showing an example of a process for recommending top venues to a target athlete based on attributes of the target user in accordance with some embodiments. In some embodiments, process 1100 is implemented at system 100 of FIG. 1. In particular, process 1100 is implemented at top venues server 110 of system 100.

Process 1100 is an example of a process for recommending top venues to a target athlete based on attributes of the target athlete and those of the athletes that have made stop events at the top venues. In some embodiments, process 1100 is performed after at least one iteration of performing process 300 of FIG. 3 or process 400 of FIG. 4. An athlete can use a process such as process 1100 to receive recommendations of top venues that are stopped at by similar athletes.

At 1102, a set of attributes associated with a target athlete is determined. A target athlete comprises a user for which top venues are to be recommended. In some embodiments, a target athlete comprises a user that submitted a user input associated with receiving top venue recommendations via an activity tracking application executing at a client device. The set of attributes associated with the target athlete may be stored. The set of attributes associated with the target athlete may include, for example, one or more of the following: the target athlete's indicated preferences, the target athlete's historical user activity patterns (e.g., the frequency, length, and/or difficulty of the target athlete's historical user activities), and the target athlete's demographic (e.g., age, gender).

At 1104, a set of athletes that is similar to the target athlete is determined based at least in part on the set of attributes. Other athletes associated with attributes that are similar to those of the target athlete are identified. For example, the stored attributes of other athletes are looked up and those that are similar to the target athlete are identified. Athletes with similar attributes to the target athlete may share the target athlete's indicated preferences, have historical user activity patterns that are similar to the target athlete's historical user activity patterns, and/or are in demographics similar to the target athlete's demographic.

At 1106, a set of top venues associated with the set of athletes that is similar to the target athlete is determined. In various embodiments, top venues have already been determined (e.g., using a process such as process 300 of FIG. 3 or process 400 of FIG. 4, described above). Historical stop events associated with the similar athletes may be analyzed to determine top venues with which they are associated. In some embodiments, the top venues may be ranked by the corresponding number of stop events made by the set of similar athletes.

At 1108, the set of top venues is presented to the target athlete. At least a portion of the highest ranking top venues may be presented for the target athlete. In some embodiments, such top venues may be presented at a map interface with indicators presented at the locations of the top venues.

Figure 12:
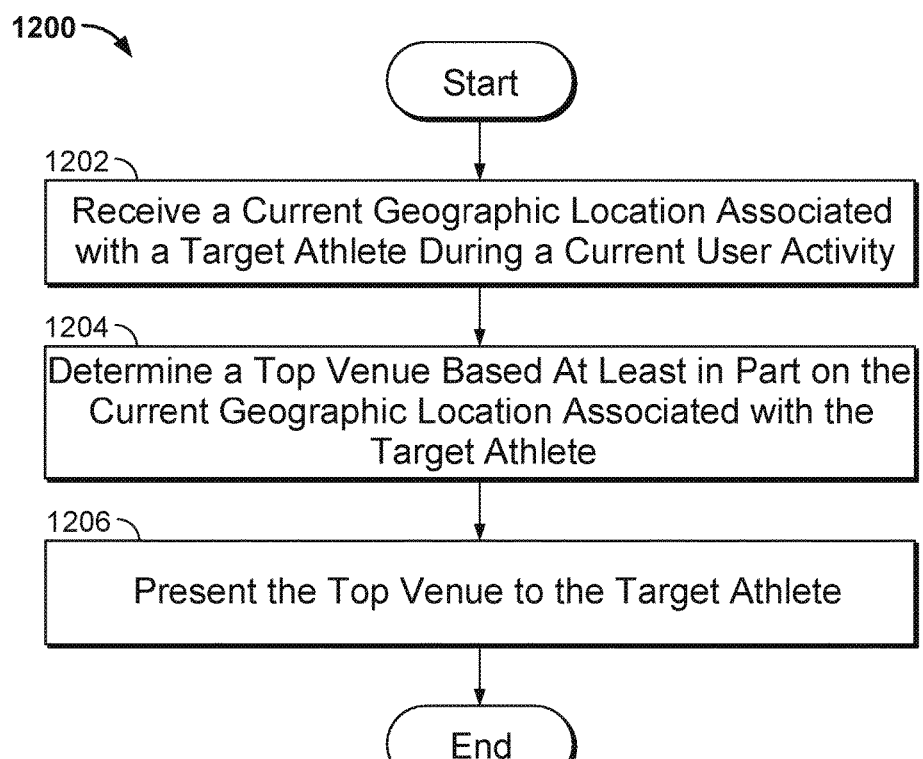
FIG. 12 is a flow diagram showing an example of a process for recommending a top venue to a target athlete during a user activity performed by the target athlete in accordance with some embodiments.

FIG. 12 is a flow diagram showing an example of a process for recommending a top venue to a target athlete during a user activity performed by the target athlete in accordance with some embodiments. In some embodiments, process 1200 is implemented at system 100 of FIG. 1. In particular, process 1200 is implemented at top venues server 110 of system 100.

Process 1200 is an example of a process for recommending a top venue to a target athlete in real-time, i.e., while the target athlete is performing a current/ongoing user activity. In some embodiments, process 1200 is performed after at least one iteration of performing process 300 of FIG. 3 or process 400 of FIG. 4.

At 1202, a current geographic location associated with a target athlete is received during a current user activity. The target athlete is currently performing an ongoing user activity (e.g., a run or a bike ride). In some embodiments, the current geographic location associated with the target athlete comprises one or more GPS points that were recently recorded in the ongoing user activity.

At 1204, a top venue is determined based at least in part on the current geographic location associated with the target athlete. In various embodiments, top venues have already been determined (e.g., using a process such as process 300 of FIG. 3 or process 400 of FIG. 4, described above). The current geographic location is compared to the GPS data associated with the top venues to determine at least one top venue that is close to the current geographic location of the target athlete.

At 1206, the top venue is presented to the target athlete. In some embodiments, the top venue is presented at a map interface (e.g., in an activity tracking application running on a client device that is used by the target athlete) with an indicator presented at the location of the top venue.

Figure 13:
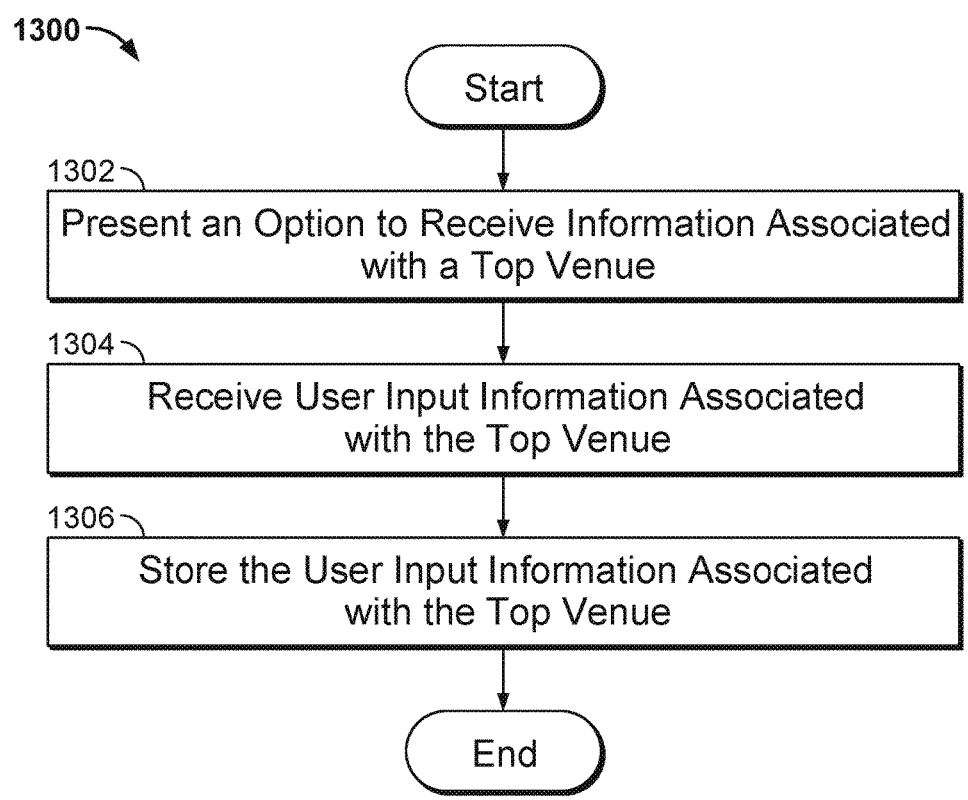
FIG. 13 is a flow diagram showing an example of a process for storing user input information associated with a top venue in accordance with some embodiments.

FIG. 13 is a flow diagram showing an example of a process for storing user input information associated with a top venue in accordance with some embodiments. In some embodiments, process 1300 is implemented at system 100 of FIG. 1. In particular, process 1300 is implemented at top venues server 110 of system 100.

Process 1300 is an example of a process for storing user input information associated with a top venue. In some embodiments, process 1300 is performed after at least one iteration of performing process 300 of FIG. 3 or process 400 of FIG. 4.

At 1302, an option to receive information associated with a top venue is presented. A prompt for an athlete to input information associated with a top venue is presented at an interface of an activity tracking application executing at a client device. For example, the prompt may be presented in response to a user check-in at a top venue or in response to a determination that the target had completed a user activity that included a stop event at the top venue.

At 1304, user input information associated with the top venue is received. Examples of user input information associated with the top venue may comprise a user rating, a user review, and information regarding when users usually make stops at the top venue.

At 1306, the user input information associated with the top venue is stored. The user input information is stored as metadata associated with the top venue. Such metadata may be presented with the top venue at a subsequent display of the top venue.

Figure 14:
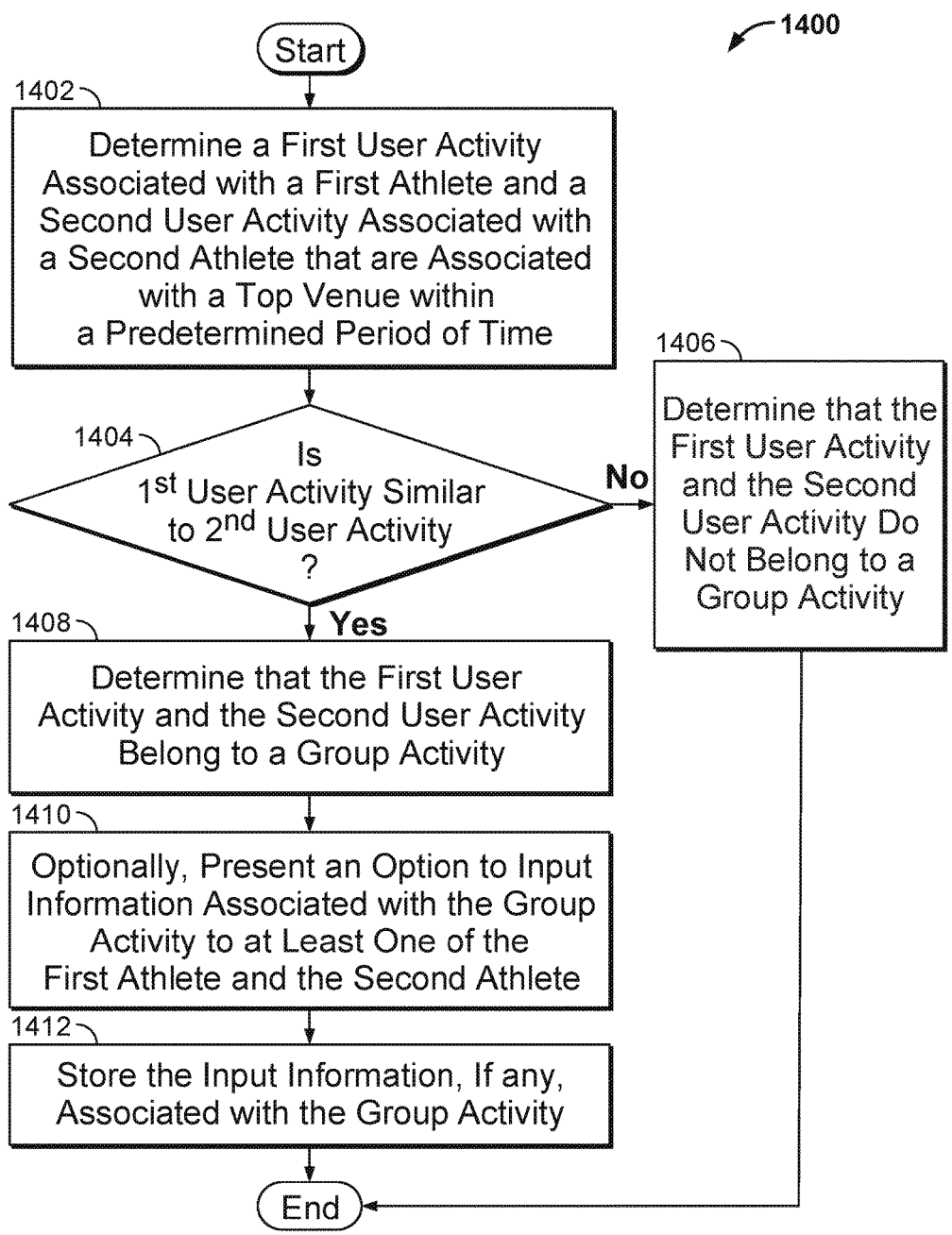
FIG. 14 is a flow diagram showing an example of a process for detecting a group activity in accordance with some embodiments.

FIG. 14 is a flow diagram showing an example of a process for detecting a group activity in accordance with some embodiments. In some embodiments, process 1400 is implemented at system 100 of FIG. 1. In particular, process 1400 is implemented at top venues server 110 of system 100.

Process 1400 is an example of a process for automatically detecting a group activity based on the user activities of multiple athletes and the common top venues at which the user activities have stop events. As mentioned above, in various embodiments, a "group activity" comprises a scenario in which multiple athletes perform user activities along a similar geographic path and also have stop events at the same top venue(s). In some embodiments, process 1400 is performed after at least one iteration of performing process 300 of FIG. 3 or process 400 of FIG. 4.

While the process 1400 describes determining whether user activities associated with two athletes belong to the same group activity, user activities associated with more than two athletes may be similarly analyzed for whether they belong to the same group activity.

At 1402, a first user activity associated with a first athlete and a second user activity associated with a second athlete that are associated with a top venue within a predetermined period of time are determined. In some embodiments, a threshold determination for whether two user activities belong to a group activity is if both user activities have stop events at the same top venue within a predetermined period of time. In some embodiments, the predetermined period of time is relatively short to ensure that the two (or more) user activities are more likely stopping at the same location together. For example, the predetermined period of time is 15 minutes. In some embodiments, the first user activity that is performed by the first athlete is analyzed for stop events and the second user activity that is performed by the second athlete is analyzed for stop events. The stop events determined from the first user activity are compared to the stop events determined from the second user activity and it is determined (1) whether a stop event associated with the first user activity matches to a top venue to which a stop event associated with the second user activity matches and (2) whether these two stop events were made at the same top venue within the predetermined period of time of each other.

In some embodiments, each of the first user activity that is performed by the first athlete is analyzed for stop events and the second user activity that is performed by the second athlete is already annotated with top venues at the respective stop events. The two user activities can then be compared for stop events that are associated with a common top venue and whether the stop events are within the predetermined period of time of each other.

These two determined user activities are candidates for user activities that belong to a group activity.

For example, a biking group activity may comprise cyclists in the group meeting up at and starting their group bike ride from the same coffee shop at a given time on a given day (e.g., 9 am on Saturday morning).

At 1404, it is determined whether GPS data associated with the first user activity is similar to GPS data associated with the second user activity. In the event that the GPS data associated with the first user activity is not similar to the GPS data associated with the second user activity, control is transferred to 1406. Otherwise, in the event that the GPS data associated with the first user activity is similar to the GPS data associated with the second user activity, control is transferred to 1408. In various embodiments, the GPS data associated with the first user activity and the GPS data associated with the second user activity are compared to determine whether they are similar and therefore, traverse over a similar geographic track. In some embodiments, only the portion of the GPS data of each user activity that was recorded subsequent to the stop event of each user activity at the common top venue determined at 1402 are compared. This is because it is assumed that in a group activity, the first and second athletes would stop at the same top venue and then continue to traverse the same route or path from that top venue. Any appropriate technique of comparing two GPS data for similarity (e.g., a predetermined threshold amount of match) may be used.

At 1406, it is determined that the first user activity and the second user activity do not belong to a group. If the GPS data associated with the first user activity is not similar to the GPS data associated with the second user activity, then it is determined that the first user activity and the second user activity do not belong to a group activity (or at least, not the same group activity). For example, if two bike rides had stop events at the same top venue within the predetermined period of time but then proceed along different geographic tracks, then it is determined that the two user activities do not belong to the same group activity. After 1406, process 1400 ends.

At 1408, it is determined that the first user activity and the second user activity belong to a group. If the GPS data associated with the first user activity is similar to the GPS data associated with the second user activity, then it is determined that the first user activity and the second user activity do belong to a group activity. For example, if two bike rides had stop events at the same top venue within the predetermined period of time and then proceeded along different geographic tracks, then it is determined that the two user activities do not belong to the same group activity.

At 1410, optionally, an option to input information associated with the group activity is presented to at least one of the first athlete and the second athlete. Because the first and second user activities have been determined to belong to a group activity, the first and second athletes associated with the respective user activities are determined to be members of that group activity. Optionally, a prompt may be presented to at least one of the first athlete and the second athlete at an activity tracking application interface to invite the athlete(s) to input information associated with the group activity. The group members may take ownership of the automatically detected group activity by inputting information associated with the group activities. Examples of information that can be input associated with a group activity include: a confirmation that the athlete is actually part of the group activity, the name of the group activity, when the group activity occurs, the frequency at which the group activity occurs, other members of the group activity, whether information associated with the group activity is publicly available, the demographics of the members in the group activity, and/or the top venues at which the group activity stops.

For example, the prompt to a group member may comprise: "What's the name of this group ride? Is it associated with a cycling club? Is it open to the public?" The prompt for user input can be presented either during a stop via a user interface of an activity tracking application that is executing at a mobile recording device, immediately after the activity data has been uploaded, or through another user interface (e.g., of a computer) at a later time.

At 1412, the input information, if any, associated with the group activity is stored.

In some embodiments, once a group activity is detected, the attributes of the user activities that belong to the group activity and/or the attributes of the athletes that are members of the group activity are determined and the group activity is classified based on the attributes of the user activities and/or the attributes of the group members. For example, the attributes of the user activities that belong to the group activity may include the distance, the elevation gain, and/or the terrain (road/dirt). For example, the attributes of the group members may include the demographics of the group, such as average age, average speed, and gender ratio. In some embodiments, a group activity may be suggested to athletes that are not members to the group activity if the attributes of the non-member athletes are similar to those associated with the group activity. For example, a female runner who typically runs eight minute miles in San Francisco can be shown popular "fast" group runs for women in their area. Or if a runner often follows the same route as an existing group run, that group run's location and time can be suggested so that the non-member runner can run with the member runners of the group.

In some embodiments, once a group activity is detected, a recurrence pattern of the group activity may also be determined by analyzing the historical data for the group activity. For example, the historical user activities of the group members of the group activity may be analyzed to determine whether the group activity is performed on a recurring basis (e.g., every Saturday morning). In some embodiments, a hiatus in the recurrence pattern of a group activity may also be detected and a third party server (e.g., associated with a weather service) may be queried to determine whether an event had occurred around the time of the hiatus (e.g., poor weather) that may explain the hiatus in the recurrence. For example, a particular group ride in New York might stop in the fall and resume in the spring. Or, by referencing a 3rd party weather dataset, it could be determined that a group ride was likely cancelled because it rained during the normal meet up time.

In some embodiments, group activities can also be ranked to give top group activities in a geographic area of interest, e.g., "Popular Group Rides for Woman Cyclists in San Francisco."

Figure 15:
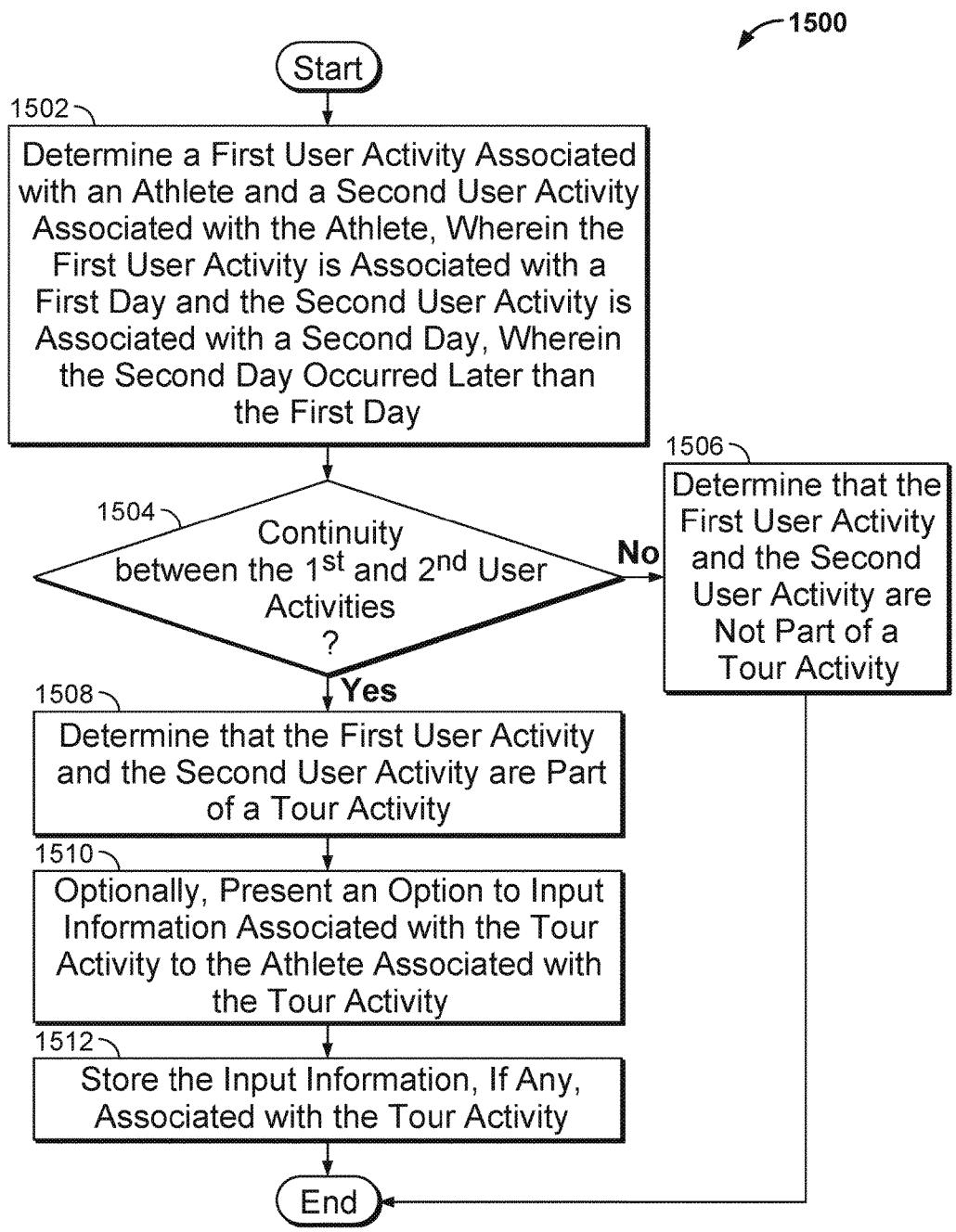
FIG. 15 is a flow diagram showing an example of a process for detecting a tour activity in accordance with some embodiments.

FIG. 15 is a flow diagram showing an example of a process for detecting a tour activity in accordance with some embodiments. In some embodiments, process 1500 is implemented at system 100 of FIG. 1. In particular, process 1500 is implemented at top venues server 110 of system 100.

Process 1500 is an example of a process for storing automatically detecting a tour activity based on the user activities of an individual athlete that were performed over multiple units of time (e.g., days). As mentioned above, in various embodiments, a "tour activity" comprises a scenario in which an individual athlete performs a series of user activities that is performed over several units of time (e.g., days). In various embodiments, a tour activity involves stopping a user activity at the end of one unit of time (e.g., a first day) at a particular venue and resuming the user activity at a later unit of time (e.g., the second day) from a nearby venue. In some embodiments, process 1500 is performed after at least one iteration of performing process 300 of FIG. 3 or process 400 of FIG. 4.

In the example of process 1500, the two units of time over which a tour activity is to be detected comprise two days. Even though process 1500 describes detecting a tour activity that occurred over two days, a tour activity associated with an athlete can also be detected across more than two days.

At 1502, a first user activity associated with an athlete and a second user activity associated with the athlete are determined, wherein the first user activity is associated with a first day and the second user activity is associated with a second day, wherein the second day occurred later than the first day. User activities associated with the same athlete are analyzed to determine whether a first of such user activities occurred on a first day and a second of such user activities had occurred on a later day. For example, the two days can comprise consecutive days or non-consecutive days. The two user activities are candidates for a tour activity associated with the athlete.

At 1504, it is determined whether continuity exists between the first user activity and the second user activity. In the event that there is continuity between the first user activity and the second user activity, control is transferred to 1508. Otherwise, in the event that there is no continuity between the first user activity and the second user activity, control is transferred to 1506. In various embodiments, "continuity" between two user activities is determined based on criteria associated with a pause in activity that can occur between user activities belonging to the same tour activity. In some embodiments, continuity between two activities belonging to the same tour activity can be user defined. For example, continuity can be found between the first user activity and the second user activity if the top venue associated with the first user activity's last stop event on the first day is near (e.g., within a predetermined range of) the top venue that is associated with the second user activity's first stop event on the second, later day that is no more than a predetermined number of days (e.g., three days) after the first day. For example, the second later day may comprise the immediate next day to the first day or more than one day after the first day. In some embodiments, the two user activities associated with the same athlete are analyzed to determine the last stop event and the associated top venue of the first user activity and the first stop event and the associated top venue of the second user activity.

An example continuity definition between two user activities of a same tour activity may be that the two user activities take place no more than three days apart and the last top venue stopped at by the first user activity must be no more than three miles away from the first top venue stopped at by the second user activity. The following are examples of user activities performed by an athlete that qualify as tour activities according to this example continuity definition:

In a first example, if Jack had biked on January 1 and stopped his biking activity at a top venue that is a motel (e.g., where Jack rested for the evening) and if Jack had resumed biking on January 2 starting from the same motel, then it can be determined that Jack's biking activity across at least January 1 and 2 comprises a tour activity.

In a second example, if Jack had biked on January 1 and stopped his biking activity at a top venue that is a motel, took a "layover day" (i.e., a day with no cycling activity), and if Jack had resumed biking on January 3 starting from a bike shop near the motel, then it can also be determined that Jack's biking activity across at least January 1 and 3 comprises a tour activity.

At 1506, it is determined that the first user activity and the second user activity are not part of a tour activity. If there is not sufficient continuity in between the first and second user activities, then it is determined that the first user activity and the second user activity are not part of a tour activity. After 1506, process 1500 ends.

At 1508, it is determined that the first user activity and the second user activity are part of a tour activity. If there is sufficient continuity in between the first and second user activities, then it is determined that the first user activity and the second user activity are part of a tour activity.

At 1510, optionally, an option to input information associated with the tour activity is presented to the athlete associated with the tour activity. A prompt to input information associated with the tour activity may be presented to the athlete at the interface of an activity tracking application executing at a client device. Examples of information that the user may input associated with the tour activity may include one or more of the following: a name of the tour activity, identifying information of other athletes that have performed the tour activity, the level of difficulty associated with the tour activity, and/or a user rating of the tour activity.

At 1512, the input information, if any, associated with the tour activity is stored.

In some embodiments, after tour activities have been determined, an ordered list of top venues at which the tour activities have included overnight stops or layovers can be suggested to athletes who are interested in performing a tour activity. For example, a set of top venues that are popular hotels for bike touring can be determined and potentially suggested to athletes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
   receive a set of location data associated with user activities, wherein the set of location data associated with the user activities is recorded by a plurality of Global Positioning System (GPS) recording devices, wherein the user activities are associated with an activity type, wherein the activity type includes at least one of cycling, running, and skiing;
   determine a plurality of stop events using the set of location data associated with the user activities, wherein a stop event comprises a portion of a user activity that matches a set of stop criteria;
   determine a plurality of clusters of stop events from the plurality of stop events based at least in part on stored location data associated with the plurality of stop events;
   compare a cluster location associated with a cluster of stop events of the plurality of clusters of stop events to a point of interest (POI) of a POI dataset to determine a set of candidate venues;
   select a plurality of top venues based at least in part on stored data associated with sets of candidate venues;
   determine that GPS information associated with a first stop event included in a first user activity associated with a first athlete matches GPS information associated with a top venue from the plurality of top venues;
   determine that GPS information associated with a second stop event included in a second user activity associated with a second athlete matches the GPS information associated with the top venue;
   determine that time information associated with the second stop event is within a predetermined period of time from time information associated with the first stop event;
   receive an indication that at least some GPS data associated with the first user activity that was recorded after the time information associated with the first stop event is similar to at least some GPS data associated with the second user activity that was recorded after the time information associated with the second stop event; and
   in response to the indication, determine that the first user activity and the second user activity belong to a group activity; and
a memory coupled to the processor and configured to provide the processor with instructions.

2. The system of claim 1 wherein the predetermined period of time comprises a first predetermined period of time and wherein the set of stop criteria comprises at least a predetermined speed associated with at least a second predetermined period of time and that does not comprise traveling more than a predetermined distance.

3. The system of claim 1, wherein to select the plurality of top venues based at least in part on the stored location data associated with the plurality of stop events includes to:
   determine the plurality of top venues from the sets of candidate venues corresponding to the plurality of clusters of stop events.

4. The system of claim 1, wherein the processor is further configured to identify a cluster of stop events, if any, of the plurality of clusters of stop events that do not match any venue from the POI dataset as an unknown location.

5. The system of claim 1, wherein the processor is further configured to:
   determine a corresponding top venue of the plurality of top venues for each stop event of the plurality of stop events; and
   score the plurality of top venues based at least in part on a number of stop events that correspond to each of at least a subset of the plurality of top venues.

6. The system of claim 1, wherein the processor is further configured to perform deduplication on the plurality of top venues.

7. The system of claim 1, wherein the processor is further configured to:
   determine a geographic area of interest;
   determine a set of top venues associated with the geographic area of interest based at least in part on the plurality of top venues; and
   present the set of top venues at a map interface associated with the geographic area of interest.

8. The system of claim 1, wherein the processor is further configured to:
   determine a geographic area of interest;
   determine a set of top venues associated with the geographic area of interest based at least in part on the plurality of top venues;
   determine one or more routes, wherein each route includes at least one top venue of the set of top venues; and
   present the one or more routes.

9. The system of claim 1, wherein the processor is further configured to:
   determine a set of attributes associated with a target athlete;
   determine a set of athletes that is similar to the target athlete based at least in part on the set of attributes;
   determine a set of top venues from the plurality of top venues that is associated with the set of athletes that is similar to the target athlete; and
   present the set of top venues to the target athlete.

10. The system of claim 1, wherein the processor is further configured to:
   receive a current geographic location associated with a target athlete during a current user activity;

determine a top venue from the plurality of top venues based at least in part on the current geographic location associated with the target athlete; and present the top venue to the target athlete.

11. The system of claim 1, wherein the processor is further configured to:

present an option to receive information associated with a top venue of the plurality of top venues;

receive user input information associated with the top venue; and store the user input information associated with the top venue.

12. The system of claim 1, wherein the processor is further configured to:

present an option to input information associated with the group activity to at least one of the first athlete and the second athlete; and store the input information, if any, associated with the group activity.

13. The system of claim 1, wherein the processor is further configured to:

determine a first user activity associated with a third athlete and a second user activity associated with the third athlete, wherein the first user activity associated with the third athlete is associated with a first day and the second user activity associated with the third athlete is associated with a second day, wherein the second day occurred later than the first day;

determine that continuity exists between the first user activity associated with the third athlete and the second user activity associated with the third athlete;

determine that the first user activity associated with the third athlete and the second user activity associated with the third athlete are part of a tour activity;

present an option to input information associated with the tour activity to the third athlete; and store the input information, if any, associated with the tour activity.

14. A method, comprising:

receiving a set of location data associated with user activities, wherein the set of location data associated with the user activities is recorded by a plurality of Global Positioning System (GPS) recording devices, wherein the user activities are associated with an activity type, wherein the activity type includes at least one of cycling, running, and skiing;

determining, using a processor, a plurality of stop events using the set of location data associated with the user activities, wherein a stop event comprises a portion of a user activity that matches a set of stop criteria;

determining a plurality of clusters of stop events from the plurality of stop events based at least in part on stored location data associated with the plurality of stop events;

comparing a cluster location associated with a cluster of stop events of the plurality of clusters of stop events to a point of interest (POI) of a POI dataset to determine a set of candidate venues;

selecting a plurality of top venues based at least in part on stored data associated with sets of candidate venues;

determining that GPS information associated with a first stop event included in a first user activity associated with a first athlete matches GPS information associated with a top venue from the plurality of top venues;

determining that GPS information associated with a second stop event included in a second user activity associated with a second athlete matches the GPS information associated with the top venue;

determining that time information associated with the second stop event is within a predetermined period of time from time information associated with the first stop event;

receiving an indication that at least some GPS data associated with the first user activity that was recorded after the time information associated with the first stop event is similar to at least some GPS data associated with the second user activity that was recorded after the time information associated with the second stop event; and in response to the indication, determining that the first user activity and the second user activity belong to a group activity.

15. The method of claim 14, wherein the predetermined period of time comprises a first predetermined period of time and wherein the set of stop criteria comprises at least a predetermined speed associated with at least a second predetermined period of time and that does not comprise traveling more than a predetermined distance.

16. The method of claim 14, wherein selecting the plurality of top venues based at least in part on the stored data associated with the plurality of stop events comprises:

determining the plurality of top venues from the sets of candidate venues corresponding to the plurality of clusters of stop events.

17. The method of claim 14, further comprising:

determining a corresponding top venue of the plurality of top venues for each stop event of the plurality of stop events; and scoring the plurality of top venues based at least in part on a number of stop events that correspond to each of at least a subset of the plurality of top venues.

18. A computer program product, the computer program product comprising a non-transitory computer readable storage medium and comprising computer instructions for:

receiving a set of location data associated with user activities, wherein the set of location data associated with the user activities is recorded by a plurality of Global Positioning System (GPS) recording devices, wherein the user activities are associated with an activity type, wherein the activity type includes at least one of cycling, running, and skiing;

determining a plurality of stop events using the set of location data associated with the user activities, wherein a stop event comprises a portion of a user activity that matches a set of stop criteria;

determining a plurality of clusters of stop events from the plurality of stop events based at least in part on stored location data associated with the plurality of stop events;

comparing a cluster location associated with a cluster of stop events of the plurality of clusters of stop events to a point of interest (POI) of a POI dataset to determine a set of candidate venues;

selecting a plurality of top venues based at least in part on stored data associated with sets of candidate venues;

determining that GPS information associated with a first stop event included in a first user activity associated with a first athlete matches GPS information associated with a top venue from the plurality of top venues;

determining that GPS information associated with a second stop event included in a second user activity associated with a second athlete matches the GPS information associated with the top venue;

determining that time information associated with the second stop event is within a predetermined period of time from time information associated with the first stop event;

receiving an indication that at least some GPS data associated with the first user activity that was recorded after the time information associated with the first stop event is similar to at least some GPS data associated with the second user activity that was recorded after the time information associated with the second stop event; and in response to the indication, determining that the first user activity and the second user activity belong to a group activity.

19. The system of claim 1, wherein the processor is further configured to:

determine one or more attributes associated with a third athlete;

compare the one or more attributes associated with the third athlete to one or more attributes associated with the group activity; and determine whether to suggest the group activity to the third athlete based at least in part on the comparison.

20. The system of claim 1, wherein the processor is further configured to determine a recurrence pattern associated with the group activity based at least in part on historical data associated with the group activity.

\* \* \* \* \*